US009183676B2

(12) United States Patent
McCulloch et al.

(10) Patent No.: US 9,183,676 B2
(45) Date of Patent: Nov. 10, 2015

(54) DISPLAYING A COLLISION BETWEEN REAL AND VIRTUAL OBJECTS

(75) Inventors: Daniel J. McCulloch, Kirkland, WA (US); Stephen G. Latta, Seattle, WA (US); Brian J. Mount, Seattle, WA (US); Kevin A. Geisner, Mercer Island, WA (US); Roger Sebastian Kevin Sylvan, Seattle, WA (US); Arnulfo Zepeda Navratil, Kirkland, WA (US); Jason Scott, Kirkland, WA (US); Jonathan T. Steed, Redmond, WA (US); Ben J. Sugden, Woodinville, WA (US); Britta Silke Hummel, Berkeley, CA (US); Kyungsuk David Lee, Redmond, WA (US); Mark J. Finocchio, Redmond, WA (US); Alex Aben-Athar Kipman, Redmond, WA (US); Jeffrey N. Margolis, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 325 days.

(21) Appl. No.: 13/458,800

(22) Filed: Apr. 27, 2012

(65) Prior Publication Data

US 2013/0286004 A1 Oct. 31, 2013

(51) Int. Cl.
*G06T 19/00* (2011.01)

(52) U.S. Cl.
CPC ............ *G06T 19/006* (2013.01); *G06T 2210/21* (2013.01)

(58) Field of Classification Search
CPC ......... G06T 15/08; G06T 17/00; G06T 19/00; G06T 15/06; G06T 15/40; G06F 3/04815

USPC .................................................. 345/419, 420
See application file for complete search history.

(56) References Cited

U.S. PATENT DOCUMENTS

| 7,050,078 | B2 * | 5/2006 | Dempski ........................ 715/700 |
| 7,259,747 | B2 | 8/2007 | Bell |
| 7,363,198 | B2 * | 4/2008 | Balaniuk et al. .................. 703/2 |
| 7,505,620 | B2 | 3/2009 | Braune et al. |
| 7,589,825 | B2 | 9/2009 | Orchard et al. |
| 7,834,846 | B1 | 11/2010 | Bell |
| 7,880,717 | B2 * | 2/2011 | Berkley et al. ................. 345/156 |

(Continued)

OTHER PUBLICATIONS

Interactive Occlusion and Collision of Real and Virtual Objects in Augmented Reality by David Breen, pp. 1-6 European Computer-Industry Research Centre, 1995.*

(Continued)

*Primary Examiner* — Kimbinh T Nguyen
(74) *Attorney, Agent, or Firm* — Dan Choi; Judy Yee; Micky Minhas

(57) ABSTRACT

Technology is described for displaying a collision between objects by an augmented reality display device system. A collision between a real object and a virtual object is identified based on three dimensional space position data of the objects. At least one effect on at least one physical property of the real object is determined based on physical properties of the real object, like a change in surface shape, and physical interaction characteristics of the collision. Simulation image data is generated and displayed simulating the effect on the real object by the augmented reality display. Virtual objects under control of different executing applications can also interact with one another in collisions.

20 Claims, 15 Drawing Sheets

(56) References Cited

U.S. PATENT DOCUMENTS

| | | | |
|---|---|---|---|
| 7,995,076 B2 | 8/2011 | Emam et al. | |
| 8,405,680 B1* | 3/2013 | Cardoso Lopes et al. | 345/633 |
| 8,624,962 B2* | 1/2014 | Lopes et al. | 348/50 |
| 8,780,108 B2* | 7/2014 | Ellens et al. | 345/419 |
| 8,786,613 B2* | 7/2014 | Millman | 345/473 |
| 2005/0288078 A1 | 12/2005 | Cheok et al. | |
| 2006/0256110 A1 | 11/2006 | Okuno et al. | |
| 2007/0092110 A1* | 4/2007 | Xu et al. | 382/103 |
| 2008/0218515 A1* | 9/2008 | Fukushima et al. | 345/424 |
| 2009/0005138 A1 | 1/2009 | Stamper et al. | |
| 2009/0322671 A1 | 12/2009 | Scott et al. | |
| 2010/0045664 A1* | 2/2010 | Ishida | 345/419 |
| 2010/0149182 A1* | 6/2010 | Butler et al. | 345/424 |
| 2010/0214111 A1 | 8/2010 | Schuler et al. | |
| 2010/0241998 A1 | 9/2010 | Latta et al. | |
| 2010/0253700 A1 | 10/2010 | Bergeron | |
| 2010/0257252 A1 | 10/2010 | Dougherty et al. | |
| 2010/0261526 A1* | 10/2010 | Anderson et al. | 463/31 |
| 2010/0302138 A1 | 12/2010 | Poot et al. | |
| 2010/0302247 A1 | 12/2010 | Perez et al. | |
| 2011/0141254 A1 | 6/2011 | Roebke et al. | |
| 2011/0205341 A1 | 8/2011 | Wilson et al. | |
| 2011/0222757 A1* | 9/2011 | Yeatman et al. | 382/154 |
| 2011/0227945 A1* | 9/2011 | Ishige et al. | 345/633 |
| 2011/0261083 A1 | 10/2011 | Wilson | |
| 2011/0316880 A1 | 12/2011 | Ojala et al. | |
| 2012/0176410 A1* | 7/2012 | Meier et al. | 345/633 |

OTHER PUBLICATIONS

Ajanki, et al., "Contextual Information Access with Augmented Reality", In Proceedings of the IEEE International Workshop on Machine Learning for Signal Processing, Aug. 29, 2010, pp. 95-100, 6 pages.

U.S. Appl. No. 13/538,691, filed Jun. 29, 2012.

Breen et al., "Interactive Occlusion and Collision of Real and Virtual Objects in Augmented Reality", Technical Report ECRC-95-02, 1995, European Computer-Industry Research Center GmbH, Munich, Germany, 22 pages.

Boulanger, et al., "A Real-Time Augmented Reality System for Industrial Tele-Training", In Proceedings of the Videometrics VII, vol. 5013, Jan. 21, 2003, pp. 1-13.

Clayton, Steve, "HoloDesk-Direct 3D Interactions with a Situated See-Through Display", Microsoft Research, Oct. 19, 2011 [retrieved on Oct. 26, 2011], Retrieved from the Internet: <URL:http://blogs.technet.com/b/next/archive/2011/10/19/microsoft-research-shows-some-fresh-thinking-on-nui-and-touch-interface.aspx>, 173 pages.

"Collision Detection," Collision Events, App Development Tool [online], [retrieved on Mar. 6, 2012], Retrieved from the Internet: <URL:http://developer.anscamobile.com/content/game-edition-collision-detection>, Ansca, Inc. 2009-2012, 12 pages.

Hasegawa et al., "Human-Scale Haptic Interaction with a Reactive Virtual Human in a Real-Time Physics Simulator", Jul. 2006, 12 pages, vol. 4, No. 3, Article 6C, ACM Computers in Entertainment, New York, NY, 12 pages.

Olaiz, et al., "3D-Audio with CLAM and Blender's Game Engine", LinuxAudio.org, [retrieved Jan. 26, 2012], Linex Audio Conference 2009, Apr. 2009, Barcelona, Spain, Retrieved from the Internet: <URL:http://lac.linuxaudio.org/2009/cdm/Thursday/05_Arumi/27.pdf>, 9 pages.

Olaiz, et al., "3D-Audio with CLAM and Blender's Game Engine", Presentation, Linux Audio Conference 2009, Apr. 2009, Barcelona, Spain, Retrieved from the Internet: <URL:http://lac.linuxaudio.org/2009/cdm/Thursday/05_Arumi/PauArumi_et_al_3DAudioWithCLAMandBlendersGameEngine.pdf>, 37 pages.

"Physics Engine," The Corona Physics API, App Development Tool [online], [retieved on Mar. 6, 2012], Retrieved from the Internet: <URL:http://developer.anscamobile.com/content/game-edition-box2d-physics-engine>, Ansca, Inc. 2009-2012,11 pages.

Response to Office Action filed Jul. 14, 2014 in U.S. Appl. No. 13/538,691, 12 pages.

Final Office Action dated Sep. 25, 2014 in U.S. Appl. No. 13/538,691, 38 pages.

Office Action dated Apr. 18, 2014 in U.S. Appl. No. 13/538,691, 46 pages.

Response to Office Action filed Dec. 11, 2014 in U.S. Appl. No. 13/538,691, 16 pages.

Office Action dated Feb. 18, 2015 in U.S. Appl. No. 13/538,691, 49 pages.

Response to Office Action filed May 15, 2015 in U.S. Appl. No. 13/538,691.

* cited by examiner

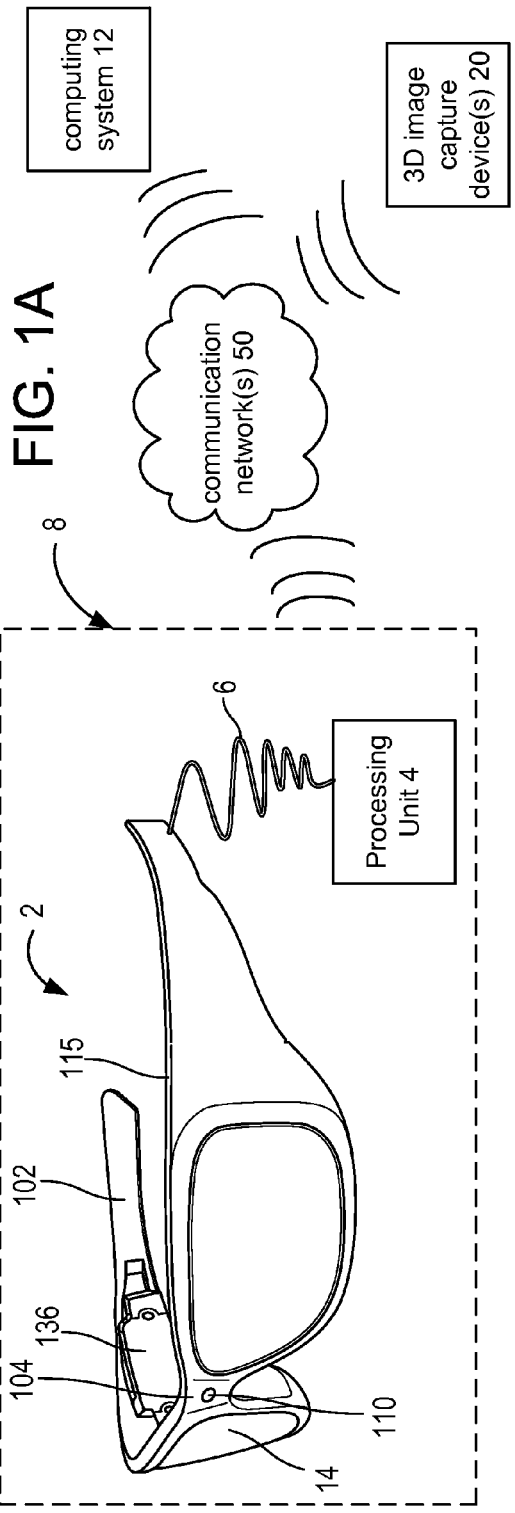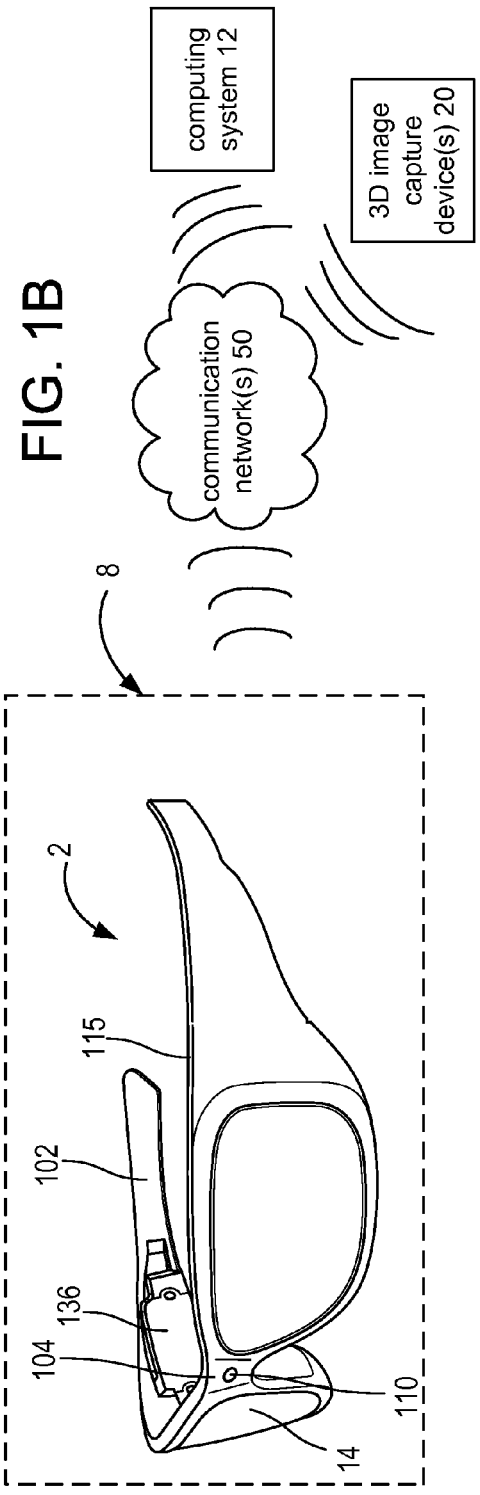

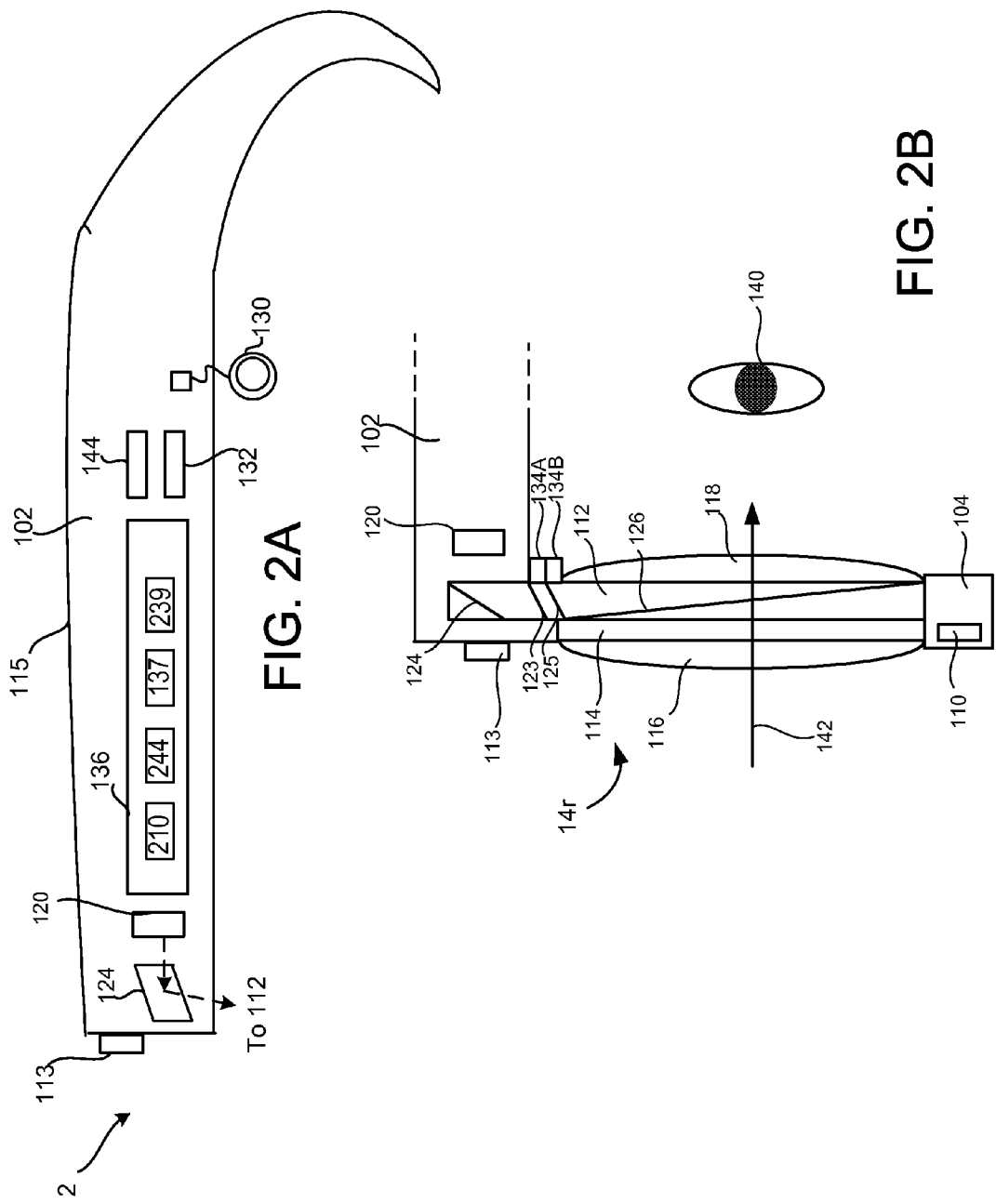

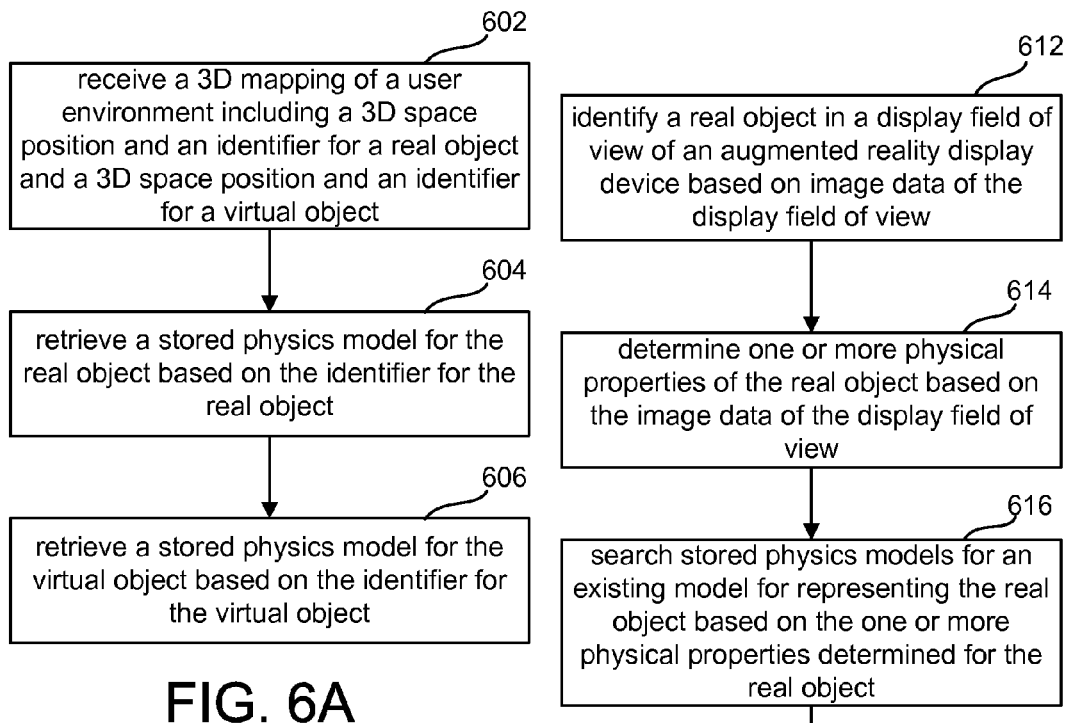
FIG. 6A
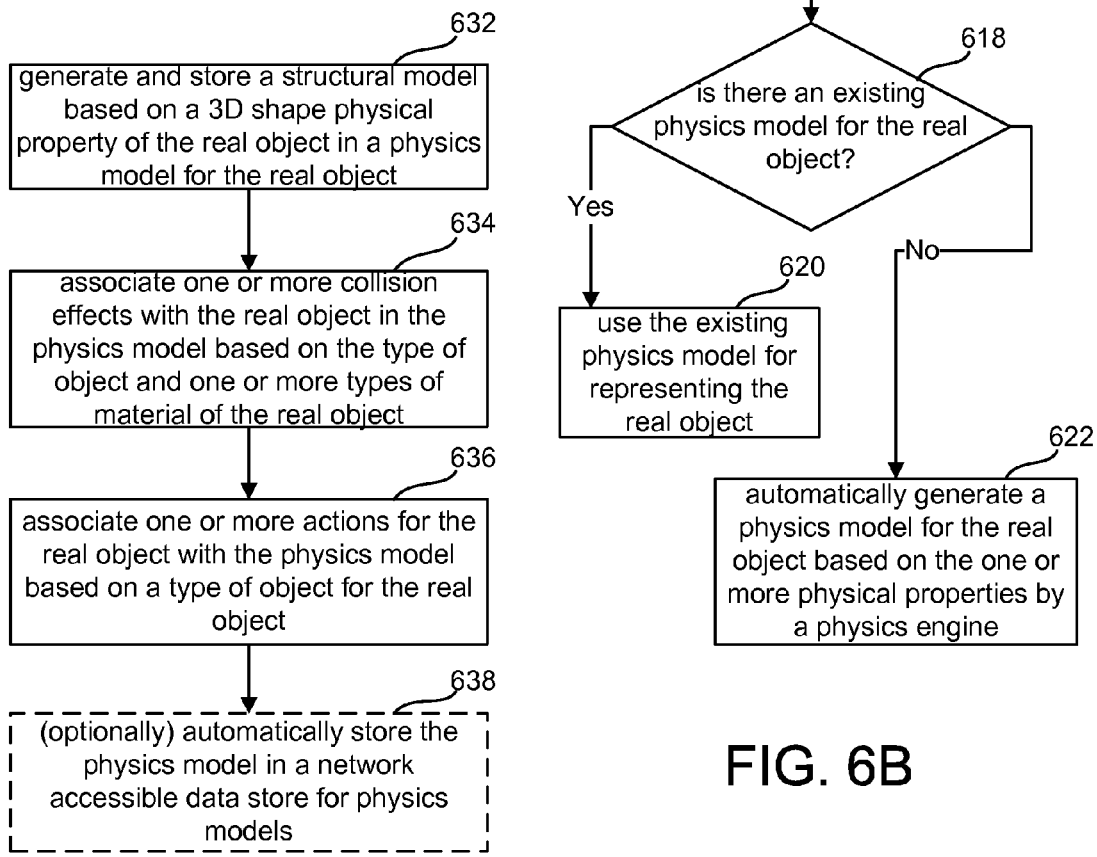
FIG. 6B
FIG. 6C

DISPLAYING A COLLISION BETWEEN REAL AND VIRTUAL OBJECTS

BACKGROUND

Augmented reality, also referred to as mixed reality, is a technology that allows virtual objects to be mixed in real time with real world objects in a display. Real objects move into and out of a field of view of an augmented reality display either due to their own movement or the user moving his or her head while virtual objects are displayed in the field of view. The realism of virtual objects is enhanced by the amount of detail in the visual appearance. However, other factors also contribute to how realistically a virtual object seems.

SUMMARY

The technology described herein provides for realistically displaying a collision between objects by an augmented reality display device system. A collision occurs when at least portions of different objects meet, and each object exerts a force upon the other causing an exchange of energy. In some embodiments, the collision is between a real object and a virtual object. For the real object, its physical properties are identified from captured image data, and often captured or derived depth data, and object reference data in at least one network accessible datastore. Image data comprises moving image data like video as well as still image data. For the real object, image data is generated and displayed which simulates at least one effect on at least one physical property of the real object due to the collision. Some embodiments display at least one effect responsive to a user initiated change of a physical property associated with the object, whether it is real or virtual. In other embodiments, virtual objects under control of different executing applications can also interact with one another in collisions.

The technology provides one or more embodiments of a method for displaying a collision between a real object and a virtual object by an augmented reality display device system. The method comprises identifying a collision between a real object and a virtual object in a display field of view of an augmented reality display based on a respective three dimensional (3D) space position associated with each object in the display field of view. At least one effect on at least one physical property of the real object due to the collision is determined based on one or more of its physical properties and the physical interaction characteristics for the collision. Image data is generated of the real object simulating the at least one effect on the at least one physical property of the real object and is displayed registered to the real object.

The technology provides one or more embodiments of an augmented reality display device system for displaying a realistic collision between a virtual object and a real object. The system comprises an augmented reality display device including an augmented reality display having a field of view and one or more processors communicatively coupled to the augmented reality display for controlling the display. The one or more processors are also communicatively coupled to at least one camera for receiving image data and depth data including the display field of view captured by the at least one camera. Based on the received image data and depth data and a three dimensional space position of the virtual object in the display field of view, the one or more processors identify a collision between a virtual object and a real object in the field of view.

A physics engine is executed by the one or more processors for simulating the collision based on a physics model representing one or more physical properties of the real object, a physics model representing one or more physical properties of the virtual object, and physical interaction characteristics of the collision. Image data simulating the collision including at least one effect on at least one physical property of the real object is generated by the one or more processors and displayed by the augmented reality display registered to the real object. In some embodiments, the augmented reality display is a see-through, augmented reality display.

The technology provides one or more embodiments of one or more processor readable storage devices comprising instructions encoded thereon which instructions cause one or more processors to execute a method for displaying a collision between objects by an augmented reality display device system. The method comprises identifying a virtual object under control of another application with a three dimensional (3D) space position in a 3D mapping of a user environment and retrieving stored physical properties data for the virtual object based on identification data received from the other application for the virtual object. A collision is identified between the virtual object and at least one other object based on their three dimensional space positions in a display field of view of the augmented reality display device system. Image data is generated representing at least one respective effect on at least one physical property of each object based on its respective one or more physical properties and physical interaction characteristics of the collision. The generated image data is displayed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1A is a block diagram depicting example components of one embodiment of an augmented reality display device system embodied as a near eye, see-through, augmented reality display device system.

FIG. 1B is a block diagram depicting example components of another embodiment of a see-through, augmented reality display device system.

FIG. 2A is a side view of an eyeglass temple of a frame in an embodiment of the see-through, augmented reality display device embodied as eyeglasses providing support for hardware and software components.

FIG. 2B is a top view of an embodiment of a display optical system of a see-through, near-eye, augmented reality device.

FIG. 6A is a flowchart of an example of an implementation process for identifying a physics model for an object.

FIG. 6B is a flowchart of an example of an implementation process for determining when to automatically generate a physics model for a real object.

FIG. 6C is a flowchart of an example of an implementation process for automatically generating a physics model for the real object based on one or more properties of the real object.

DETAILED DESCRIPTION

Figure 3A:
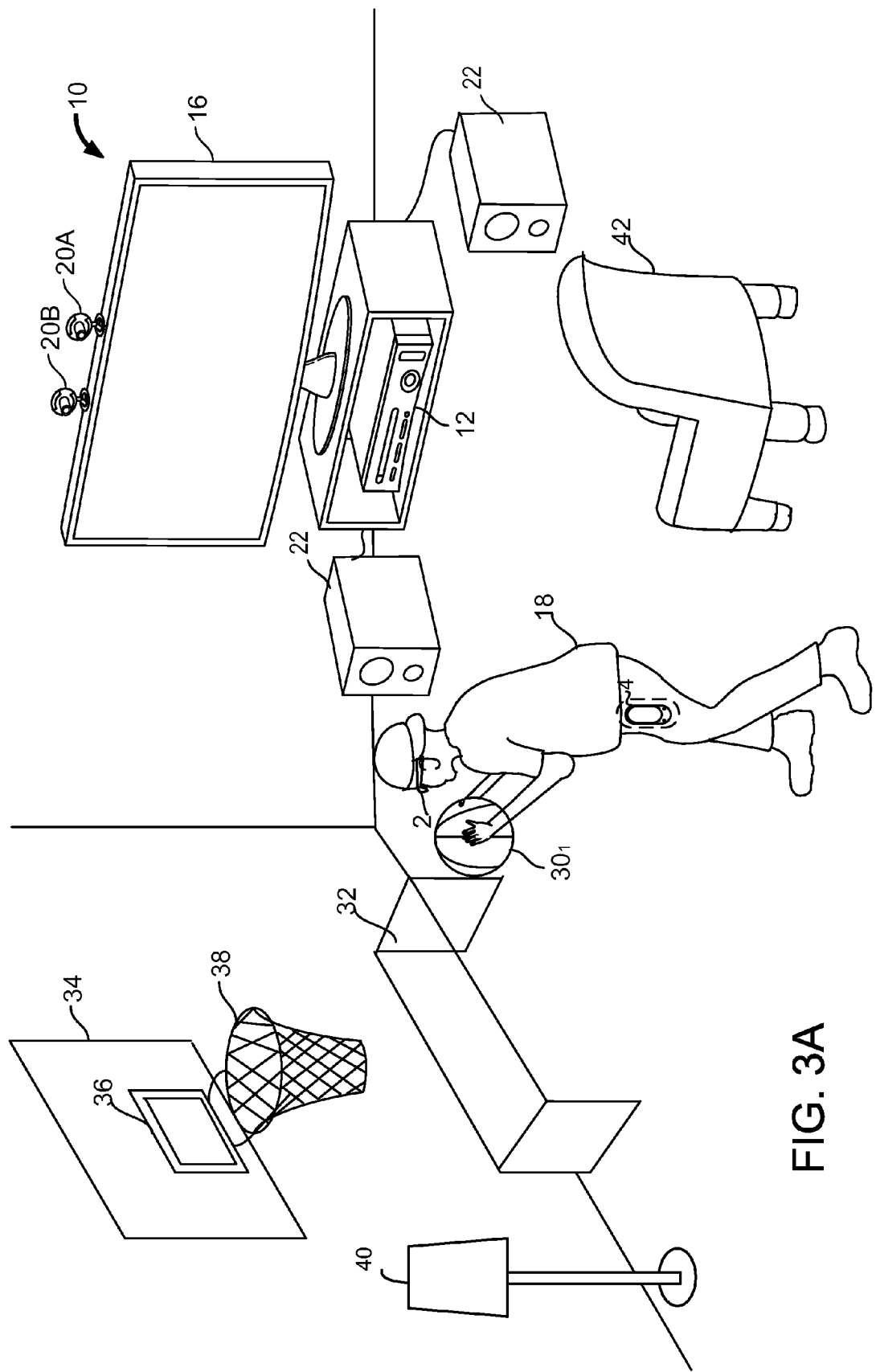
FIG. 3A illustrates an example of a user environment and an application in progress in which one or more embodiments of the technology may operate.

Various embodiments are described for realistically displaying a collision between objects by an augmented reality display device system, an example of which is a see-through, augmented reality display device system. The term "collision" in this specification is used in a physics sense of the word meaning a physical contact during which at least portions of different objects meet, and each object exerts a force upon the other causing an exchange of energy. In many cases, the collision changes at least the direction of motion of one or more objects or at least a change in momentum. In some embodiments, the collision is between a real object and a virtual object. For the real object, its physical properties are identified based on captured image data and object reference data in at least one network accessible datastore. In many examples, a physics model of the real object is or has been generated for the real object based on its physical properties by a physics engine.

A physics engine is software which is a physics simulator. The physics often simulated for objects is Newtonian rigid body physics which may be used to represent the force of gravity and how forces effect objects visible to the human eye on Earth. Although other types of applications use them as well, physics engines are a staple for game applications to make their virtual objects look, move and react more realistically. There are open source physics engines like Corona® which application developers for mobile devices may use. For higher end systems, physics engines for modeling real time collisions and dynamics of objects in three dimensions may be used like Havoc™ Physics which have been used by gaming systems like Xbox®, Xbox 360®, Nintendo's GameCube and Wii® and versions of Sony's Playstation® line. In video games in which the user environment is completely computer controlled, a physics model for each object can be predefined which describes how the virtual object moves, reacts to collisions of various force directions and strengths, and effects resulting from collisions. Additionally, the types of collisions can be predefined between the virtual objects in the game since all their physical properties are predefined. This is unlike a user wearing an augmented reality display device which displays virtual objects in real time in a real world environment. In particular, a user wearing a see-through, augmented reality display device system actually sees with his or her natural sight a real object which is not occluded by image data of a virtual object or virtual effects in a display field of view of the see-through display, hence the name see-through display. For other types of augmented reality displays like video-see displays or those operating in a video-see mode, the display is not see-through, and image data of unoccluded real objects as they would appear with natural sight are displayed for the user as well as virtual imagery. The term "display field of view" refers to the field of view of the display portion of the display device system as the display portion is what the user looks through.

A three dimensional (3D) model including object spatial positions within at least the display field of view may be mapped based on captured image data and depth data derived from stereopsis processing of the image data or captured depth data from one or more depth sensors and the image data. A collision between a real object and a virtual object is identified based on image data, and typically, the collision is identified and modeled in three dimensions (3D) based on image and depth data subject to depth resolution constraints.

This physics model for the real object can be manipulated by a physics engine to represent one or more effects on at least one physical property of the real object during the collision, resulting from the collision, or both. For the real object, image data is generated for simulating one or more effects due to the collision and is displayed registered to the real object. Image data which is registered to an object, real or virtual, means the image data tracks its position in the display field of view in reference to or dependent upon a position of the other object to which it is registerd. In the illustrated example of FIG. 3B below, the registered image data of a cracked glass table top is registered to overlay a glass table top surface of the real glass table. This type of overlay may be called a skin. The glass pieces $37_N$ on the floor are virtual objects of registered image data which track their position to be under the table top from the correct user perspective for viewing them with a display device system 8.

What a viewer sees from his point of view is his field of view. A point of view is also called a perspective. In some embodiments, a perspective of a user wearing a display device, referred to hereafter as a user perspective and the display field of view from the user perspective, may be approximated by a view dependent coordinate system, having orthogonal X, Y and Z axes in which a Z-axis represents a depth position from a reference point on the front of the display device system 8 or one or more points determined in relation to the front of the display device system like an approximate location for the user's foveae.

In some embodiments, a physical property of a real object can be changed responsive to user input. For example, a property of a real object may be changed to provide a cartoon effect. Some embodiments may also have virtual objects under control of different executing applications interacting with one another. The virtual object's collision behavior and appearance in the field of view of the display is updated by the controlling application.

FIG. 1A is a block diagram depicting example components of an embodiment of a see-through, augmented or mixed reality display device system. System 8 includes a see-through display device as a near-eye, augmented reality display device 2 in communication with a processing unit 4 via a wire 6 in this example or wirelessly in other examples. In this embodiment, head mounted, display device 2 is in the shape of eyeglasses in a frame 115, with a display optical system 14 for each eye in which image data is projected into a user's eye to generate a display of the image data while a user also sees through the display optical systems 14 for an actual direct view of the real world. Each display optical system 14 is also referred to as a see-through display, and the two display optical systems 14 together may also be referred to as a see-through display.

The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room.

Frame 115 provides a support structure for holding elements of the system in place as well as a conduit for electrical connections. In this embodiment, frame 115 provides a convenient eyeglass frame as support for the elements of the system discussed further below. Some other example of a near-eye support structure are a visor frame or a goggles support. The frame 115 includes a nose bridge portion 104 with a microphone 110 for recording sounds and transmitting audio data to control circuitry 136. A temple or side arm 102 of the frame rests on each of a user's ears, and in this example the temple 102 is illustrated as including control circuitry 136 for the display device 2.

As illustrated in FIGS. 2A and 2B, an image generation unit 120 is included on each temple 102 in this embodiment as well. Also, not shown in this view, but illustrated in FIGS. 2A and 2B are outward facing cameras 113 for recording digital images and videos and transmitting the visual recordings to the control circuitry 136 which may in turn send the captured image data to the processing unit 4 which may also send the data to one or more computer systems 12 over a network 50.

Figure 10:
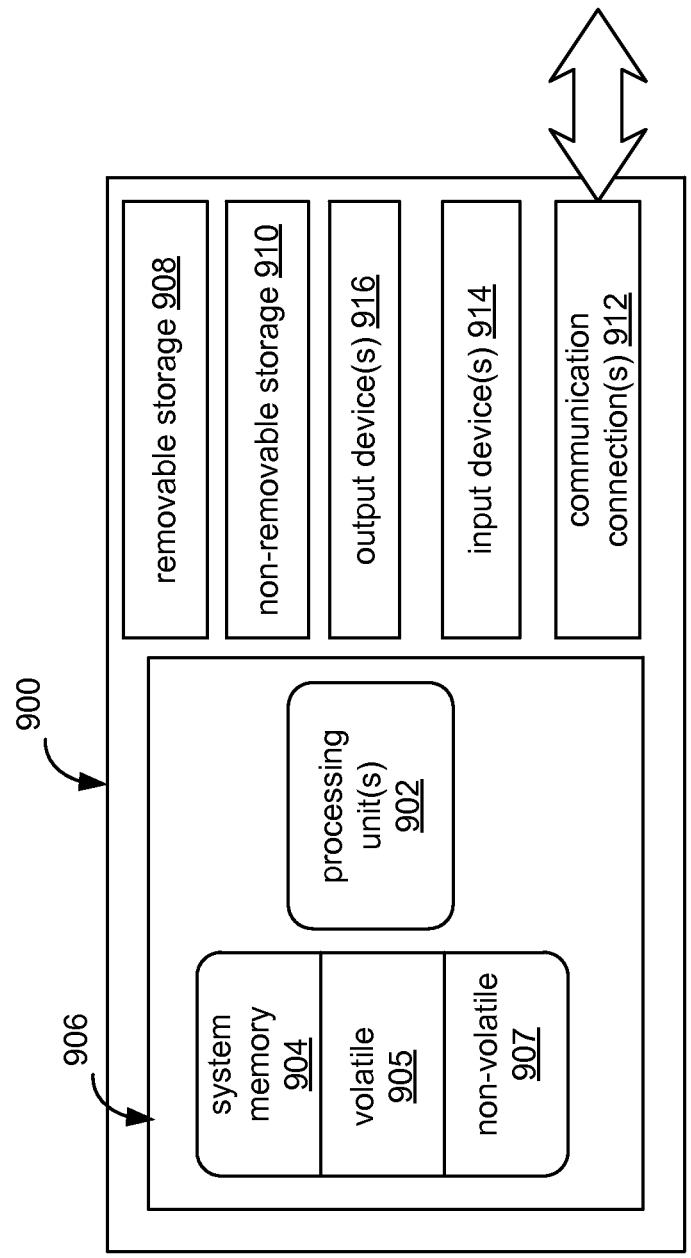
FIG. 10 is a block diagram of one embodiment of a computing system that can be used to implement a network accessible computing system or a processing unit.

The processing unit 4 may take various embodiments. In some embodiments, processing unit 4 is a separate unit which may be worn on the user's body, e.g. a wrist, or be a separate device like a mobile device (e.g. smartphone). The processing unit 4 may communicate wired or wirelessly (e.g., WiFi, Bluetooth, infrared, RFID transmission, wireless Universal Serial Bus (WUSB), cellular, 3G, 4G or other wireless communication means) over a communication network 50 to one or more computing systems 12 whether located nearby or at a remote location. In other embodiments, the functionality of the processing unit 4 may be integrated in software and hardware components of the display device 2 as in FIG. 1B. Some examples of hardware components of the processing unit 4 are shown in FIG. 10.

One or more remote, network accessible computer system(s) 12 may be leveraged for processing power and remote data access. An example of hardware components of a computing system 12 is shown in FIG. 10. An application may be executing on computing system 12 which interacts with or performs processing for an application executing on one or more processors in the see-through, augmented reality display system 8. For example, a 3D mapping application may be executing on the one or more computers systems 12 and the user's display device system 8. In some embodiments, the application instances may perform in a master and client role in which a client copy is executing on the display device system 8 and performs 3D mapping of its display field of view, receives updates of the 3D mapping from the computer system(s) 12 including updates of objects in its view from the master 3D mapping application and sends image data, and depth and object identification data, if available, back to the master copy.

Additionally, in some embodiments, the 3D mapping application executing on different display device systems 8 in the same environment share data updates in real time, for example object identifications and occlusion data like an occlusion volume for a real object, in a peer-to-peer configuration between devices or to a 3D mapping application executing in one or more network accessible computing systems.

The shared data in some examples may be referenced with respect to a common coordinate system for the environment. In other examples, one head mounted display (HMD) device may receive data from another HMD device including image data or data derived from image data, position data for the sending HMD, e.g. GPS or IR data giving a relative position, and orientation data. An example of data shared between the HMDs is depth map data including image data and depth data captured by its front facing cameras 113, object identification data, and occlusion volumes for real objects in the depth map. The real objects may still be unidentified or have been recognized by software executing on the HMD device or a supporting computer system, e.g. 12 or another display device system 8. In a case of not using a common coordinate system, the second HMD can map the position of the objects in the received depth map for its user perspective based on the position and orientation data of the sending HMD. Any common objects identified in both the depth map data of a field of view of the recipient HMD device and the depth map data of a field of view of the sending HMD device may also be used for mapping.

An example of an environment is a 360 degree visible portion of a real location in which the user is situated. A user may only be looking at a subset of his environment which is his field of view. For example, a room is an environment. A person may be in a house and be in the kitchen looking at the top shelf of the refrigerator. The top shelf of the refrigerator is within his display field of view, the kitchen is his environment, but his upstairs bedroom is not part of his current environment as walls and a ceiling block his view of the upstairs bedroom. Of course, as he moves, his environment changes. Some other examples of an environment may be a ball field, a street location, a section of a store, a customer section of a coffee shop and the like. A location can include multiple environments, for example, the house may be a location. The user and his friends may be wearing their display device systems for playing a game which takes place throughout the house. As each player moves about the house, his environment changes. Similarly, a perimeter around several blocks may be a location and different intersections provide different environments to view as different cross streets come into view. In some instances, a location can also be an environment depending on the precision of location tracking sensors or data.

In the illustrated embodiments of FIGS. 1A and 1B, the computer system(s) 12 and the display device system 8 also have network access to 3D image capture devices 20. Capture devices 20 may be, for example, cameras that visually monitor one or more users and the surrounding space such that gestures and/or movements performed by the one or more users, as well as the structure of the surrounding space including surfaces and objects, may be captured, analyzed, and tracked. Such information may be used for example, to update display positions of virtual objects, displaying location based information to a user, and for identifying gestures to indicate one or more controls or actions for an executing application (e.g. game application).

Capture devices 20 may be depth cameras positioned in a user environment. According to an example embodiment, each capture device 20 may be configured with RGB and IR components to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight. The depth image may include a two-dimensional (2-D) pixel area of the captured field of view where each pixel in the 2-D pixel area may represent a length in, for example, centimeters, millimeters, or the like of an object in the captured field of view from the camera.

FIG. 1B is a block diagram depicting example components of another embodiment of a see-through, augmented or mixed reality display device system 8 which may communicate over a communication network 50 with other devices. In this embodiment, the control circuitry 136 of the display device 2 incorporates the functionality which a processing unit provides in FIG. 1A and communicates wirelessly via a wireless transceiver (see 137 in FIG. 2A) over a communication network 50 to one or more computer systems 12.

FIG. 2A is a side view of an eyeglass temple 102 of the frame 115 in an embodiment of the see-through, augmented reality display device 2 embodied as eyeglasses providing support for hardware and software components. At the front of frame 115 is physical environment facing video camera 113 that can capture video and still images, typically in color, of the real world to map real objects in the display field of view of the see-through display, and hence, in the field of view of the user.

In some examples, the cameras 113 may also be depth sensitive cameras which transmit and detect infrared light from which depth data may be determined. In other examples, a separate depth sensor (not shown) on the front of the frame 115 may also provide depth data to objects and other surfaces in the field of view. The depth data and image data form a depth map of the captured field of view of the cameras 113 which are calibrated to include the display field of view. A three dimensional (3D) mapping of the display field of view can be generated based on the depth map. Some examples of depth sensing technologies that may be included on the head mounted display device 2 without limitation, are SONAR, LIDAR, Structured Light, and/or Time of Flight.

In some embodiments, stereopsis is used for determining depth information instead of or in addition to a depth sensor. The outward facing cameras 113 provide overlapping image data from which depth information for objects in the image data may be determined based on stereopsis. Parallax and contrasting features such as color contrast may be used to resolve a relative position of one real object from another in the captured image data, for example for objects beyond a depth resolution of a depth sensor.

The cameras 113 are also referred to as outward facing cameras meaning facing outward from the user's head. The illustrated camera 113 is a front facing camera which is calibrated with respect to a reference point of its respective display optical system 14. One example of such a reference point is an optical axis (see 142 in FIG. 2B) of its respective display optical system 14. The calibration allows the field of view of the display optical systems 14, also referred to as the display field of view, to be determined from the data captured by the cameras 113.

Control circuits 136 provide various electronics that support the other components of head mounted display device 2. In this example, the right temple 102r includes control circuitry 136 for the display device 2 which includes a processing unit 210, a memory 244 accessible to the processing unit 210 for storing processor readable instructions and data, a wireless interface 137 communicatively coupled to the processing unit 210, and a power supply 239 providing power for the components of the control circuitry 136 and the other components of the display 2 like the cameras 113, the microphone 110 and the sensor units discussed below. The processing unit 210 may comprise one or more processors including a central processing unit (CPU) and a graphics processing unit (GPU), particularly in embodiments without a separate processing unit 4, which contains at least one graphics processing unit (GPU).

Inside, or mounted to temple 102, are an ear phone 130 of a set of ear phones 130, inertial sensors 132, one or more location or proximity sensors 144, some examples of which are a GPS transceiver, an infrared (IR) transceiver, or a radio frequency transceiver for processing RFID data. In one embodiment, inertial sensors 132 include a three axis magnetometer, a three axis gyro, and a three axis accelerometer. The inertial sensors are for sensing position, orientation, and sudden accelerations of head mounted display device 2. From these movements, head position, and thus orientation of the display device, may also be determined. In this embodiment, each of the devices processing an analog signal in its operation include control circuitry which interfaces digitally with the digital processing unit 210 and memory 244 and which produces or converts analog signals, or both produces and converts analog signals, for its respective device. Some examples of devices which process analog signals are the sensor devices 144, 132, and ear phones 130 as well as the microphone 110, cameras 113 and an IR illuminator 134A, and an IR detector or camera 134B discussed below, Mounted to or inside temple 102 is an image source or image generation unit 120 which produces visible light representing images. The image generation unit 120 can display a virtual object to appear at a designated depth location in a field of view to provide a realistic, in-focus three dimensional display of a virtual object which interacts with one or more real objects. Some examples of embodiments of image generation units 120 which can display virtual objects at various depths are described in the following applications which are hereby incorporated by reference: "Automatic Variable Virtual Focus for Augmented Reality Displays," having U.S. patent application Ser. No. 12/941,825 and inventors Avi Bar-Zeev and John Lewis, and which was filed Nov. 8, 2010 and "Automatic Focus Improvement for Augmented Reality Displays," having U.S. patent application Ser. No. 12/949,650 and inventors Avi Bar-Zeev and John Lewis, and which was filed Nov. 18, 2010. In these examples, a focal length for an image generated by the microdisplay is changed by adjusting a displacement between an image source such as a microdisplay and at least one optical element like a lens or by adjusting the optical power of an optical element which receives the light representing the image. The change in focal length results in a change in a region of the field of view of the display device in which the image of the virtual object appears to be displayed. In one example, multiple images, each including a virtual object, may be displayed to the user at a rate rapid enough so human temporal image fusion makes the images appear to be present at once to human eyes. In another example, a composite image of the in-focus portions of the virtual images generated at the different focal regions is displayed.

In one embodiment, the image generation unit 120 includes a microdisplay for projecting images of one or more virtual objects and coupling optics like a lens system for directing images from the microdisplay to a reflecting surface or element 124. The microdisplay may be implemented in various technologies including transmissive projection technology, micro organic light emitting diode (OLED) technology, or a reflective technology like digital light processing (DLP), liquid crystal on silicon (LCOS) and Mirasol® display technology from Qualcomm, Inc. The reflecting surface 124 directs the light from the image generation unit 120 into a lightguide optical element 112, which directs the light representing the image into the user's eye.

FIG. 2B is a top view of an embodiment of one side of a see-through, near-eye, augmented reality display device including a display optical system 14. A portion of the frame 115 of the near-eye display device 2 will surround a display optical system 14 for providing support and making electrical connections. In order to show the components of the display optical system 14, in this case 14r for the right eye system, in the head mounted display device 2, a portion of the frame 115 surrounding the display optical system is not depicted.

In the illustrated embodiment, the display optical system 14 is an integrated eye tracking and display system. The system embodiment includes an opacity filter 114 for enhancing contrast of virtual imagery, which is behind and aligned with optional see-through lens 116 in this example, lightguide optical element 112 for projecting image data from the image generation unit 120 is behind and aligned with opacity filter 114, and optional see-through lens 118 is behind and aligned with lightguide optical element 112.

Light guide optical element 112 transmits light from image generation unit 120 to the eye 140 of the user wearing head mounted, display device 2. Light guide optical element 112 also allows light from in front of the head mounted, display device 2 to be transmitted through light guide optical element 112 to eye 140, as depicted by arrow 142 representing an optical axis of the display optical system 14r, thereby allowing the user to have an actual direct view of the space in front of head mounted, display device 2 in addition to receiving a virtual image from image generation unit 120. Thus, the walls of light guide optical element 112 are see-through. Light guide optical element 112 is a planar waveguide in this embodiment and includes a first reflecting surface 124 (e.g., a mirror or other surface) which reflects incident light from image generation unit 120 such that light is trapped inside the waveguide. A representative reflecting element 126 represents the one or more optical elements like mirrors, gratings, and other optical elements which direct visible light representing an image from the planar waveguide 112 towards the user eye 140.

Infrared illumination and reflections, also traverse the planar waveguide 112 for an eye tracking system 134 for tracking the position of the user's eyes which may be used for applications such as gaze detection, blink command detection and gathering biometric information indicating a personal state of being for the user. The eye tracking system 134 comprises an eye tracking IR illumination source 134A (an infrared light emitting diode (LED) or a laser (e.g. VCSEL)) and an eye tracking IR sensor 134B (e.g. IR camera, arrangement of IR photodetectors, or an IR position sensitive detector (PSD) for tracking glint positions). In this embodiment, representative reflecting element 126 also implements bidirectional infrared (IR) filtering which directs IR illumination towards the eye 140, preferably centered about the optical axis 142 and receives IR reflections from the user eye 140. In some examples, reflecting element 126 may include a hot mirror or gratings for implementing the bidirectional IR filtering. A wavelength selective filter 123 passes through visible spectrum light from the reflecting surface 124 and directs the infrared wavelength illumination from the eye tracking illumination source 134A into the planar waveguide 112. Wavelength selective filter 125 passes the visible light and the infrared illumination in an optical path direction heading towards the nose bridge 104. Wavelength selective filter 125 directs infrared radiation from the waveguide including infrared reflections of the user eye 140, preferably including reflections captured about the optical axis 142, out of the waveguide 112 to the IR sensor 134B.

In other embodiments, the eye tracking unit optics are not integrated with the display optics. For more examples of eye tracking systems for HMD devices, see U.S. Pat. No. 7,401,920, entitled "Head Mounted Eye Tracking and Display System", issued Jul. 22, 2008 to Kranz et al., see U.S. patent application Ser. No. 13/221,739, Lewis et al., entitled "Gaze Detection in a See-Through, Near-Eye, Mixed Reality Display," filed Aug. 30, 2011, and see U.S. patent application Ser. No. 13/245,700, Bohn, entitled "Integrated Eye Tracking and Display System," filed Sep. 26, 2011, all of which are incorporated herein by reference.

Opacity filter 114, which is aligned with light guide optical element 112, selectively blocks natural light from passing through light guide optical element 112 for enhancing contrast of virtual imagery. When the system renders a scene for the augmented reality display, it takes note of which real-world objects are in front of which virtual objects and vice versa. If a virtual object is in front of a real-world object, then the opacity is turned on for the coverage area of the virtual object. If the virtual object is (virtually) behind a real-world object, then the opacity is turned off, as well as any color for that display area, so the user will only see the real-world object for that corresponding area of real light. The opacity filter assists the image of a virtual object to appear more realistic and represent a full range of colors and intensities. In this embodiment, electrical control circuitry for the opacity filter, not shown, receives instructions from the control circuitry 136 via electrical connections routed through the frame. More details of an opacity filter are provided in U.S. patent application Ser. No. 12/887,426, "Opacity Filter For See-Through Mounted Display," filed on Sep. 21, 2010, incorporated herein by reference in its entirety.

Again, FIGS. 2A and 2B only show half of the head mounted display device 2. A full head mounted display device would include another set of optional see-through lenses 116 and 118, another opacity filter 114, another light guide optical element 112, another image generation unit 120, physical environment facing camera 113 (also referred to as outward facing or front facing camera 113), eye tracking assembly 134, and earphone 130. Additional details of a head mounted display device system are illustrated in U.S. patent application Ser. No. 12/905,952 entitled Fusing Virtual Content Into Real Content, Filed Oct. 15, 2010, fully incorporated herein by reference.

Figure 3B:
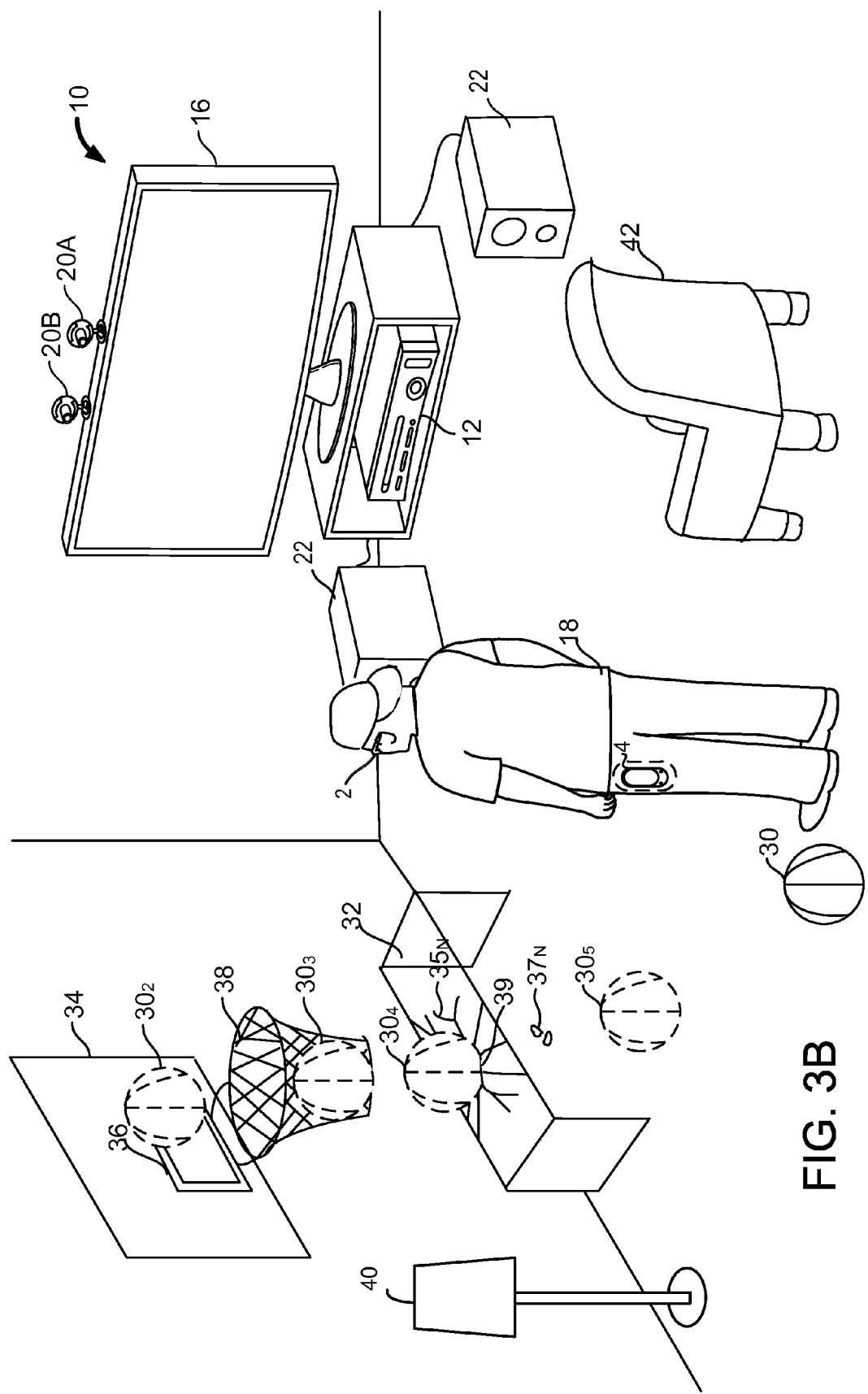
FIG. 3B illustrates examples of displayed collisions of a virtual object with other objects and a simulated effect on a physical property of a real object due to at least one of the collisions.
Figure 4A:
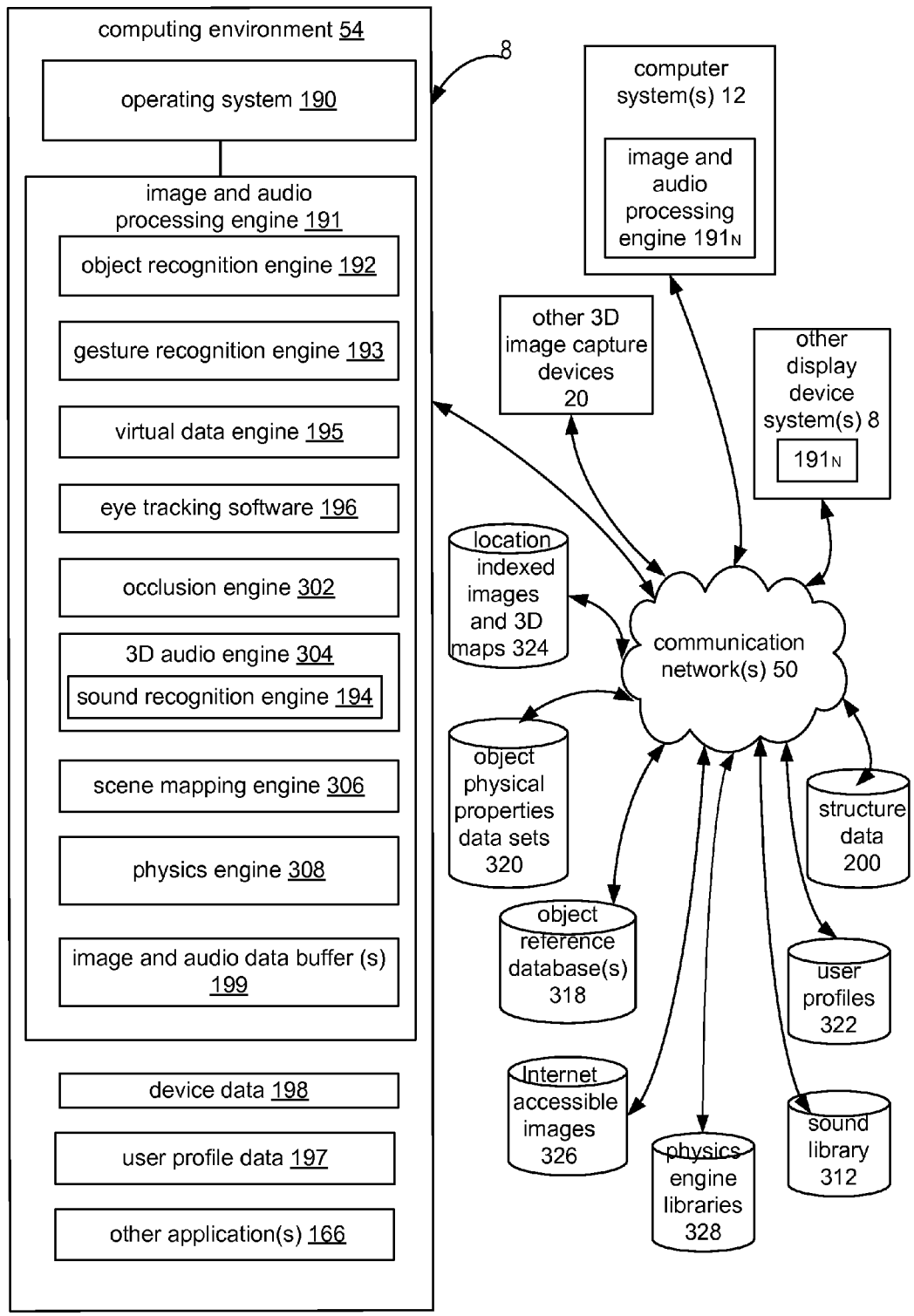
FIG. 4A is a block diagram of a system from a software perspective for displaying a collision between objects by an augmented reality display device system.
Figure 4B:
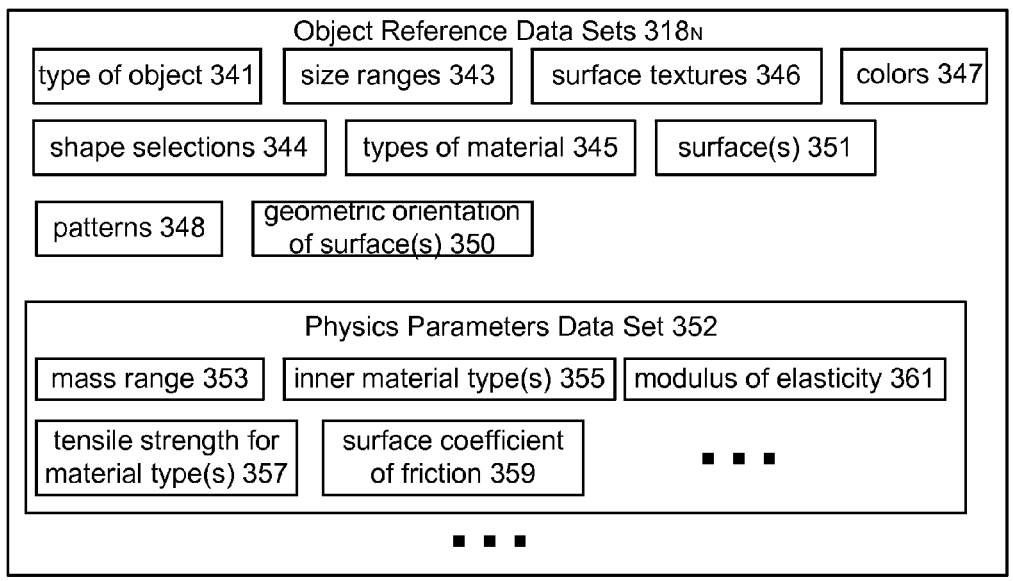
FIG. 4B illustrates an example of an object reference data set.
Figure 4C:
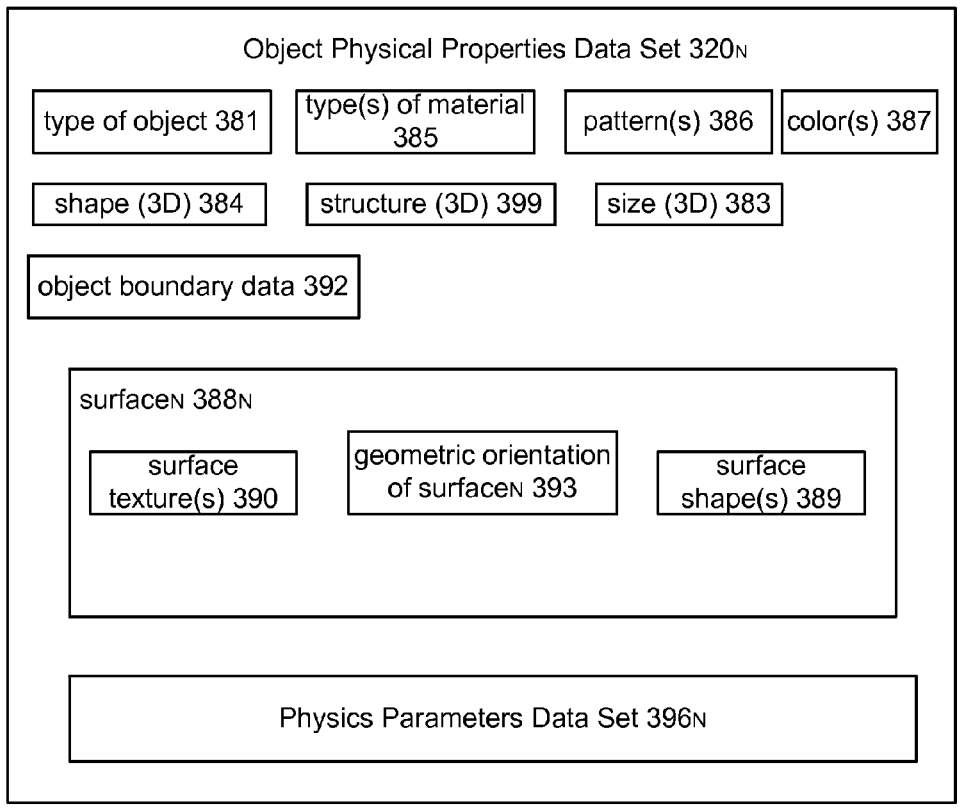
FIG. 4C illustrates some examples of data fields in an object physical properties data set.

FIGS. 3A and 3B illustrate a contextual example of a user environment with real and virtual objects in which the technology may operate. An application identifies or provides physics models for the virtual objects it generates, and a physics engine has either generated or retrieved from storage a physics model for each real object. The more a physics model accounts for the specific physical properties of a type of object or a specific object, the more realistic the motion, collisions and collision effects will be for the object. For example, a physics engine or simulator may have a code subdivision of a ballistics simulator which may be used for modeling a number of projectiles, for example an arrow or a bullet. Input parameters of the physical properties of the arrow or the bullet make the resulting projectile motion what one expects from an arrow rather than a bullet (See Ian Millington, Game Physics Engine Development: How to Build a Robust Commercial Grade Physics Engine for Your Game, 2d edition, 2010 Elsevier, p. 3, hereafter Millington.) A physics engine is discussed in FIG. 4A, and FIGS. 4B and 4C provide examples of physical properties and are discussed further below.

FIG. 3A illustrates an example of a user environment and an exemplary basketball application in progress in which one or more embodiments of the technology may operate. A user 18, "Joe", is playing a virtual basketball application in a user environment of his living room. Chair 42, glass table 32, lamp 40, and home entertainment system 10 are all real. The basketball backboard 34 with its box 36 and the hoop or basket 38 are virtual, meaning they are projected image data. The home entertainment system 10 includes a network accessible computer or hub 12 which in this example is a gaming console. Joe's processing unit 4 is embodied in a mobile smartphone in this example as well which communicates wirelessly with the hub 12 and Joe's display device 2. In addition to a television 16 and speakers 22, the gaming console 12 controls two depth cameras 20A and 20B for capturing image and depth data of the living room for a 3D mapping of the living room including real and virtual objects therein. The gaming console 12 can communicate positions and object identification information to the processing unit 4 to cut down on processing time for the display device system (2 and 4). Processing unit 4 can also send image data of Joe's field of view to the gaming console.

In some examples, a user like Joe may be instructed to turn his head in a certain order for capturing a 360 degree view of an environment, and may be asked to identify objects, for example by gestures like pointing captured by the front facing cameras 113, the depth cameras 20A and 20B, or both and speaking data such as names of items for the microphone 110 to capture. This making of an inventory of objects may be done when an environment is not recognized in order to speed up an initial 3D mapping of the environment and the identity and physical properties of objects therein.

The 3D mapping of the living room may be stored on the console or in a cloud based storage unit to include positions of stationary real objects and objects which entered the environment for future use. Additionally, the physical properties for real objects can be stored as well. Once a physics model is generated, even different versions of the physics model as discussed below, the model can be stored and retrieved from memory to save processing time.

Joe holds a virtual basketball 30 as he readys for a throw at the basket 38. Joe's holding of the basketball is a collision so it is subscripted 30₁ to assist in following the motion of the ball. Joe's hands apply forces on the ball 30 and the ball has reactive forces. The basketball application executing in Joe's display device system (2 and 4) provides a physics model for each of the virtual objects it generates like the basketball 30, the basket 38 and the backboard 34 with box 36. The physics models for the real objects were derived from image data, any user provided information during an inventory, and object reference data discussed below. Based on physical properties of the basketball like the air pressure within a basketball and its firm rubber surface material, a change in the shape of the virtual basketball is so small that the change in shape on the visible ball is not visible to the human eye. For example, the ball does not appear to be pressed inward where Joe's hands touch it. The forces of Joe's hands are counteracted by forces directed outward from the basketball, but a pressing out of the basketball towards Joe's hands is also not visible. The applied and reactive forces are in equilibrium in the ball hold.

Due to its physical properties like its spherical shape, firm rubber surface material and inner material of air, a basketball moves in a certain way. When it performs an action, an example of which is a bounce, the physics engine implements the action in accordance with the physical properties of the basketball and one or more forces applied to it.

FIG. 3B illustrates examples of displayed collisions of a virtual object with other objects and a simulated effect on a physical property of a real object due to at least one of the collisions. The path of virtual basketball 30 is again subscripted. Joe has scored a basket. In the second collision, virtual basketball $30_2$ hits the upper right corner of the box 36 of the backboard 34. A reactive force from the backboard and the pull of gravity are modeled to counteract the basketball's force into the backboard, and the virtual ball $30_3$ falls into the basketball hoop 38 scoring a basket in this third collision of falling through the net. The net of hoop 38 is also a virtual object whose shape is modeled to conform to movement of a basketball passing through it. Different versions of the physics model of the net may be advanced to model behavior of other objects passing through it as well.

The motion of the virtual basketball $30_4$ continues with a fourth collision with the glass top of table 32. Based on a predefined mass associated with the basketball in its physics model and a velocity assigned to the basketball by the application or the physics model, one or more force vectors being exerted by the basketball can be determined based on Newton's Second Law, force equals mass times acceleration or force equals mass times one half the velocity squared.

$$Force = \tfrac{1}{2}mv^2$$

A physics model for the glass may be based on more details obtained from object reference data sources such as the type of glass and impurities and such or it may be more generic and treat all glass with the same parameters. In addition to the one or more force vectors being exerted or applied by the basketball, other types of force vectors may also be modeled such as resistive force vectors of the glass table top 32 and an environmental force vector like gravity.

Different types of objects react to the same forces being applied to them differently due to their physical properties like surface material, inner material, tensile strength, thickness, mass and the like. A surface of a basketball may puncture or tear, but glass cracks and breaks. A physics model for the glass has parameters defining cracking and breaking criteria for glass. Based on the one or more modeled force vectors in the collision of the glass table top 32 with the virtual basketball $30_4$ coming out of the virtual hoop 38, the physics engine determines how much the bottom of the basketball $30_4$ flattens and comes in contact with the glass.

As shown in FIG. 3B, the one or more force vectors were concentrated in a small enough area of the glass to cause a cracking criteria to be satisfied as illustrated by various cracks like representative crack $35_N$ and was also enough for a complete break in the table top resulting in small pieces like representative $37_N$ falling on the floor. The cracking and breaking of the glass would take a significant amount of the energy in the collision, leaving the basketball $30_5$ with an amount of energy under the conservation of energy principle for a very small bounce or maybe a roll off the table. Eventually, the basketball 30 rolls and stops near Joe's feet.

In some embodiments, an application may include its own physics engine for modeling virtual and real object collisions. In other embodiments like in this example, the physics engine is part of a gaming platform with which applications like the basketball application have a software interface for passing data. For example, the basketball application is notified of the motion and collisions of the basketball with respect to other objects so it can keep score and may receive image data of how Joe holds the ball to compare with patterns and display advice associated with a matched pattern for improving Joe's throw ability. For real objects effected by the collision, the physics engine identifies one or more effects to software which generates image data (for example, see the discussion of virtual data engine 195 in FIG. 4A) of the real object simulating the effect. For example, in the cracked and broken glass for the table 32, image data in the form of video data and a still of the real table is generated and projected in Joe's field of view by the display device 2 to show cracking of the glass 2 into the resultant cracks 35N and the falling of the glass pieces 37N onto the floor. The display of the cracks and broken pieces can continue to be displayed as the application session continues. A user can also issue a reset command, and see the fallen pieces return to the glass table and the cracks disappear, for example, by running the video backward. In other examples, a less detail oriented physics engine may have determined a breaking criteria was satisfied and displayed the glass table top breaking into pieces which fall on the floor rather than doing a more complicated crack and break scenario as depicted.

FIG. 4A is a block diagram of a system from a software perspective for displaying a collision between objects by an augmented reality display device system, an example of which is a near-eye, see-through display device system. FIG. 4A illustrates a computing environment embodiment 54 from a software perspective which may be implemented by a system like display device system 8, one or more remote computing systems 12 in communication with one or more display device systems or a combination of these. Additionally, display device systems can communicate with other display device systems for sharing data and processing resources. Network connectivity allows leveraging of available computing resources. As shown in the embodiment of FIG. 4A, the software components of a computing environment 54 comprise an image and audio processing engine 191 in communication with an operating system 190. Image and audio processing engine 191 processes image data (e.g. moving data like video or still), and audio data in order to support applications executing for a head mounted display (HMD) device system like a see-through, augmented reality display device system 8. Image and audio processing engine 191 includes object recognition engine 192, gesture recognition engine 193, virtual data engine 195, eye tracking software 196 if eye tracking is in use, an occlusion engine 302, a 3D positional audio engine 304 with a sound recognition engine 194, a scene mapping engine 306, an occlusion engine 302 and a physics engine 308 all in communication with each other.

The computing environment 54 also stores data in image and audio data buffer(s) 199. The buffers provide memory for receiving image data captured from the outward facing cameras 113, image data captured by other capture devices if available, image data from an eye tracking camera of an eye tracking assembly 134 if used, buffers for holding image data of virtual objects to be displayed by the image generation units 120, and buffers for both input and output audio data like sounds captured from the user via microphone 110 and sound effects for an application from the 3D audio engine 304 to be output to the user via earphones 130.

Image and audio processing engine 191 processes image data (e.g. video or image), depth and audio data received from one or more capture devices which may be available in a location. Image and depth information may come from the outward facing cameras 113 captured as the user moves his head or body and additionally based on captured data from other display device systems 8 and other image data captured of the location such as stored image data and maps 324 or provided by other 3D image capture devices 20 in the location, e.g. capture devices 20A and 20B.

A 3D mapping of the display field of view of the augmented reality display can be determined by the scene mapping engine 306 based on captured image data and depth data for the display field of view. A depth map can represent the captured image data and depth data. A view dependent coordinate system may be used for the mapping of the display field of view as how a collision between objects appears to a user depends on the user's point of view. An example of a view dependent coordinate system is an x, y, z coordinate system in which the z-axis or depth axis extends orthogonally or as a normal from the front of the see-through display. In some examples, the image and depth data for the depth map representing the display field of view is received from the cameras 113 on the front of the display device 2. The display field of view may also be determined remotely or using a combination of remote (e.g. 12 or another display system 8) and local processing.

Mapping what is around the user in the user's environment can be aided with sensor data. Data from an orientation sensing unit 132, e.g. a three axis accelerometer and a three axis magnetometer, determines position changes of the user's head and correlation of those head position changes with changes in the image and depth data from the front facing cameras 113 can identify positions of objects relative to one another and at what subset of an environment a user is looking. As mentioned above, depth map data of another HMD device, currently or previously in the environment, along with position and head orientation data for this other HMD device can also be used to map what is in the user environment. Shared real objects in their depth maps can be used for image alignment and other techniques for image mapping. With the position and orientation data as well, what objects are coming into view can be predicted as well so physical interaction processing, occlusion and other processing can start even before the objects are in view.

The scene mapping engine 306 can also use a view independent coordinate system for 3D mapping. The map can be stored in the view independent coordinate system in a storage location (e.g. 324) accessible as well by other display device systems 8, other computer systems 12 or both, be retrieved from memory and be updated over time as one or more users enter or re-enter the environment. In some examples, image and object registration into a common coordinate system may be performed using an extrinsic calibration process. The registration and/or alignment of images (or objects within the images) onto a common coordinate system allows the scene mapping engine to be able to compare and integrate real-world objects, landmarks, or other features extracted from the different images into a unified 3-D map associated with the real-world environment.

When a user enters an environment, the scene mapping engine 306 may first search for a pre-generated 3D map identifying 3D space positions and identification data of objects stored locally or accessible from another display device system 8 or a network accessible computer system 12. The map may include stationary objects. The map may also include objects moving in real time and current light and shadow conditions if the map is presently being updated by another system. For example, a pre-generated map indicating positions, identification data and physical properties of stationary objects in a user's living room derived from image and depth data from previous HMD sessions can be retrieved from memory. Additionally, identification data including physical properties for objects which tend to enter the location can be preloaded for faster recognition. A pre-generated map may also store physics models for objects as discussed below. A pre-generated map may be stored in a network accessible database like image and map database(s) 324.

The environment may be identified by location data which may be used as an index to search in location indexed image and pre-generated 3D map databases 324 or in Internet accessible images 326 for a map or image related data which may be used to generate a map. For example, location data such as GPS data from a GPS transceiver 144 on the display device 2 may identify the location of the user. Additionally, an IP address of a WiFi hotspot or cellular station to which the display device system 8 has a connection can identify a location. Cameras at known positions within a location may identify the user and other people through facial recognition. Additionally, identifier tokens may be exchanged between display device systems 8 via infra-red, Bluetooth or WUSB. The range of the infra-red, WUSB or Bluetooth signal can act as a predefined distance for determining proximity of another user. Maps and map updates, or at least object identification data may be exchanged between display device systems via infra-red, Bluetooth or WUSB as the range of the signal allows.

An example of image related data which may be used to generate a mape is meta data associated with any matched image data, from which objects and their positions within a coordinate system for the environment can be identified. For example, a relative position of one or more objects in image data from the outward facing cameras 113 of the user's display device system 8 can be determined with respect to one or more GPS tracked objects in the location from which other relative positions of real and virtual objects can be identified.

As described in the discussion of FIGS. 1A and 1B, image data for mapping an environment can come from cameras other than those 113 on the user's display device 2. Image and depth data from multiple perspectives can be received in real time from other 3D image capture devices 20 under control of one or more network accessible computer systems 12 or from at least one other display device system 8 in the environment. Depth images from multiple perspectives may be combined based on a view independent coordinate system for describing an environment (e.g. an x, y, z representation of a room, a store space, or a geofenced area) for creating the volumetric or 3D mapping. For example, if the scene mapping engine 306 receives depth images from multiple cameras, the engine 306 correlates the images to have a common coordinate system by lining up the images and uses depth data to create the volumetric description of the environment. The scene mapping engine 306 identifies the position and tracks the movement of real and virtual objects in the volumetric space based on communications with the object recognition engine 192 of the image and audio processing engine 191 and one or more executing applications 166 generating virtual objects. The scene mapping engine 306 may be in communication with other scene mapping engines 306 executing in other systems (e.g. 12 and 8).

In some instances, a scene mapping engine 306 on a network accessible computer system 12 receives image data of multiple display fields of view from multiple see-through augmented reality display device systems 8 in an environment and correlates their image data based on capture times for the data in order to track changes of objects and lighting and shadow in the environment in real time. 3D map updates can then be sent to the multiple display device systems 8 in the environment. (For more information on collaborative scene mapping between HMDs like system 8 and hub computer systems 12 with access to image data, see "Low-Latency Fusing of Virtual and Real Content," having U.S. patent application Ser. No. 12/912,937 having inventors Avi Bar-Zeev et al. and filed Oct. 27, 2010 and which is hereby incorporated by reference.)

In some examples, a 3D mapping, whether it be a depth map generated by front facing cameras 113 including a display field of view, a 3D mapping of an environment or a location in a view independent coordinate system, or somewhere in between, may be modeled as a 3D mesh of an environment. A mesh may comprise a detailed geometric representation of various features including real and virtual objects and surfaces thereof within a particular environment or region of an environment. A 3D point cloud representing the surfaces of objects including things like walls and floors in a space can be generated based on captured image data and depth data of the user environment. A 3D mesh of the surfaces in the environment can then be generated from the point cloud. More information regarding the generation of 3-D maps can be found in U.S. patent application Ser. No. 13/017,690, "Three-Dimensional Environment Reconstruction," incorporated herein by reference in its entirety. 3D mesh representations of virtual objects can be added.

The object recognition engine 192 of the image and audio processing engine 191 detects, tracks and identifies real objects in the display field of view and the 3D environment of the user based on captured image data and depth data if available or determined depth positions from stereopsis. The object recognition engine 192 distinguishes real objects from each other by marking object boundaries and comparing the object boundaries with structural data. One example of marking object boundaries is detecting edges within detected or derived depth data and image data and connecting the edges. The object boundary data is then compared with stored structure data in order to identify a type of object within a probability criteria. A polygon mesh may also be used to represent the object's boundary as mentioned above. One or more databases of structure data 200 accessible over one or more communication networks 50 may include structural information about objects. As in other image processing applications, a person can be a type of object, so an example of structure data is a stored skeletal model of a human which may be referenced to help recognize body parts. Structure data 200 may also include structural information regarding one or more inanimate objects in order to help recognize the one or more inanimate objects, some examples of which are furniture, sporting equipment, automobiles and the like.

The structure data 200 may store structural information as image data or use image data as references for pattern recognition. The image data may also be used for facial recognition. The object recognition engine 192 may also perform facial and pattern recognition on image data of the objects based on stored image data from other sources as well like user profile data 197 of the user, other users profile data 322 accessible by a hub, location indexed images and 3D maps 324 and Internet accessible images 326. Motion capture data from image and depth data may also identify motion characteristics of an object. The object recognition engine 192 may also check detected properties of an object against reference properties of an object like its size, shape and motion characteristics. An example of such a set of reference properties for an object is an object reference data set as stored in objects reference database(s) 318.

FIG. 4B illustrates an example of an object reference data set 318N with some examples of data fields which the data set may include. The object reference data sets 318 available to the object recognition engine 192 may have been predetermined manually offline by an application developer or by pattern recognition software and stored. Additionally, if a user inventorizes an object by viewing it with the display device system 8 and inputting data for the data fields, an object reference data set is generated. Also, object reference data sets can be created and stored for sharing with other users as indicated in share permissions. Furthermore, the object recognition engine 192 can search accessible user profile data 197, 322 for information on objects in an environment. An example of such information is purchase data with product identifiers which can then be searched by the object recognition engine 192 in order to locate product descriptions with more details, for example in online catalog entries and product sites. The image data of the object may also be a basis for image searching for more descriptive data as may be found in metadata to fill in the data fields. This allows for more detailed object reference data sets 318.

Particularly, for an object recognition engine executing on one or more hub computer systems 12 with access to multiple users profile data 322 and more extensive computing and storage resources, such searching can be done in the background. Over time as the library or database of object reference data sets 318 grows, objects are recognized more quickly. In some embodiments, the object recognition engine 192 can automatically update data for a type of object data set 318 and also automatically create a new data set for a previously unidentified type of object. In some examples implementing automatic update and automatic generation of new data sets, the object recognition engine 192 can display a message to the user or a database manager indicating additional data is available for a type of object or a previously unknown type of object in order to obtain permission before automatically generating the set. Either the user or the database manager can grant permission to update an existing data set or create and store a new one.

The data fields described below are representative examples and are not intended to be all inclusive. Furthermore, there may be a data set for a general type of object, like chair or car, and then data sets for specific types of chairs or cars. For example, a data set may include a base class object of chair and then sub-classes of chaise-lounge, folding chair, etc. with additional data fields for describing additional features specific to the sub-class. The illustrated data fields include a type of object 341 which may be a data record which also includes sub-fields. For the type of object 341, the other data fields provide data records identifying the types of physical properties available for the type of object. The other examples of data records include size ranges 343, shape selections available 344, typical types of material 345, colors available 347, patterns available 348, surface(s) available 351, typical surface texture(s) 346, and a geometric orientation 350 of each available surface 351.

There may also be stored a physics parameters data set 352 for each object reference data set 318N. The example physics parameters include a mass range 353 for the type of object 341, one or more inner material type(s) 355, a modulus of elasticity 361 for use with Hooke's Law, one or more tensile strengths associated with one or more material types 357 including at least a surface material type, and a surface coefficient of friction 359 associated with the surface material. Air may be considered a type of inner material. These parameters may be selected for a physics model representing an object for use by a physics engine 308 as discussed below.

FIG. 4C illustrates some examples of data fields in an object physical properties data set 320N stored for a real object, which includes data values detected or otherwise determined based on captured data of the real object, or for a specific virtual object. The example data fields include a type of object 381, size 383, in three dimensions in this example, shape 384, also 3D in this example, structure 399 (e.g. skeletal or for an inanimate object), also in three dimensions in this example, object boundary data 392, such as for example the determined edge data or a polygon mesh for a real object or the boundary data of a virtual object, and type(s) of material 385. For a real object, a type of surface material may be determined based on captured image data, and the types of inner material determined based on an object reference data set 318N or other object reference data source like 197, 322, 324, and 326. Some other exemplary data fields include pattern(s) 386 and colors 387 as well as surface(s) 388N.

Surface 388N represents an exemplary data set for each surface identified. The data set includes one or more surface textures 390, a geometric orientation 393 of the surface N, and a surface shape 389 (e.g. flat, round, curvy, uneven, etc.).

For real objects, data is assigned to each of these data fields based on a weighted probability by the object recognition engine 192 as it detects object boundary data and colors and derives shapes and surfaces and looks up object reference data. These different properties are then weighted, and a probability is assigned whether an object in the image data is a certain type of object, and if the probability satisfies a criteria for a certain type of object, that type of object is assigned as the type of object 381 The object physical properties data set 320N is then stored in one or more network accessible data stores 320. A physics parameter data set 396N with data fields like those in the corresponding data set 352, but with values for the specific real or virtual object, is also included in the object physical properties data set 320N. These are assigned by an application or the physics engine for virtual objects. For real objects, the physics data fields can be determined from object reference data sources based on the type of object 381 and physical properties determined by the object recognition engine 192.

Upon detection of one or more objects by the object recognition engine 192, image and audio processing engine 191 may report to operating system 190 an identification of each object detected and a corresponding position and/or orientation which the operating system 190 passes along to other executing applications like the scene mapping engine 306, the occlusion engine 302, the physic engine 308 and other upper level applications 166.

The occlusion engine 302 identifies spatial occlusions between objects, and in particular between real and virtual objects based on spatial position data for recognized objects within a coordinate system as updated by the objection recognition engine 192 and the scene mapping engine 306. As virtual and real objects have size and shape, a 3D space position for each object may be defined by the scene mapping engine to incorporate the volume occupied by each object. In the case of complete occlusion of a virtual object by a real object, the occlusion engine can notify the virtual data engine to not display the virtual object. In the case of complete occlusion of the real object by the virtual object, the virtual object or its parts can be sized to completely cover the real object and its parts. For partial occlusions, the display is updated to show part of the virtual object and part of the real object. In the example of FIG. 3A, when Joe 18 looks at the ball he is holding, the occlusion engine 302 modifies the surface boundary displayed of the ball so Joe's hands block parts of the ball. For more information about occlusion processing, see U.S. patent application Ser. No. 12/905,952 entitled "Fusing Virtual Content into Real Content,"-Flaks et al., and filed Oct. 15, 2010, which is hereby incorporated by reference and see also U.S. patent application Ser. No. 13/443,368 entitled "Realistic Occlusion for a Head Mounted Augmented Reality Display" Geisner et al., and filed Apr. 10, 2012, which is hereby incorporated by reference.

The 3D audio engine 304 is a positional 3D audio engine which receives input audio data and outputs audio data for the earphones 130 or other output audio devices like speakers in other embodiments. The received input audio data may be for a virtual object or be that generated by a real object. Audio data for virtual objects generated by an application can be output to the earphones to sound as if coming from the direction of the virtual object projected into the display field of view. An example of a positional 3D audio engine which may be used with an augmented reality system is disclosed in U.S. patent application Ser. No. 12/903,610 entitled "System and Method for High-Precision 3-Dimensional Audio for Augmented Reality," to Flaks et al., and filed Oct. 13, 2010, which is hereby incorporated by reference. Audio data from a sound library 312 may be associated with one or more collisions or actions for a particular physics model by an application or a user so that the physics engine 308 will play the audio data during display of one or more collisions or actions.

Sound recognition software engine 194 of the 3D audio engine identifies audio data from the real world received via microphone 110 for application control via voice commands and for environment and object recognition. Based on a sound library 312, the engine 304 can identify a sound with a physical object, e.g. a horn sound associated with a certain make or model of car. Additionally, voice data files stored in user profile data 197 or user profiles 322 may also identify a speaker with whom a person object mapped in the environment may be associated. In addition to uploading their image data, display device systems 8 and 3D image capture devices 20 in a location upload their captured audio data to a hub computing system 12. Additionally, pre-generated 3D maps of a location can provide an audio index of sounds of objects fixed in the location or which enter and leave the location on a regular basis, e.g. train and bus sounds.

The outward facing cameras 113 in conjunction with the object recognition engine 192 and gesture recognition engine 193 implements a natural user interface (NUI) in embodiments of the display device system 8. Blink commands or gaze duration data identified by the eye tracking software 196 are also examples of physical action user input. Voice commands may also supplement other recognized physical actions such as gestures and eye gaze.

The gesture recognition engine 193 can identify actions performed by a user indicating a control or command to an executing application. The action may be performed by a body part of a user, e.g. a hand or finger, but also an eye blink sequence of an eye can be a gesture. In one embodiment, the gesture recognition engine 193 includes a collection of gesture filters, each comprising information concerning a gesture that may be performed by at least a part of a skeletal model. The gesture recognition engine 193 compares a skeletal model and movements associated with it derived from the captured image data to the gesture filters in a gesture library to identify when a user (as represented by the skeletal model) has performed one or more gestures. In some examples, matching of image data to image models of a user's hand or finger during gesture training sessions may be used rather than skeletal tracking for recognizing gestures.

Just as application can upload gesture filters to indicate controls in their games, an application can identify or register an action which is a pre-collision event or a collision trigger or a collision itself as a gesture for processing by the physics engine. Upon recognizing the gesture, the gesture recognition engine 193 notifies the physics engine 308. An example of such a gesture as a collision is Joe's holding the ball in FIG. 3A. The gesture recognition engine 193 can identify the throw gesture based on image and depth data from the front facing cameras 113 on his display device 2 or from captured data from the environment depth cameras 20A and 20B or from another display device's capture data, or a combination of these.

More information about the detection and tracking of objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about the gesture recognition engine 193 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

The physics engine 308 simulates the physics of motion of objects and the exchange of energy between objects as forces are applied to them. A physics simulator uses rules for a specific context or environment. An application can define a physics environment. For example, an environment having a different gravitational force than Earth's can be requested by inputting different environmental parameters. In the illustrative examples discussed herein, Newton's laws of physics are used as the illustrative rules for a physical environment.

Figure 4D:
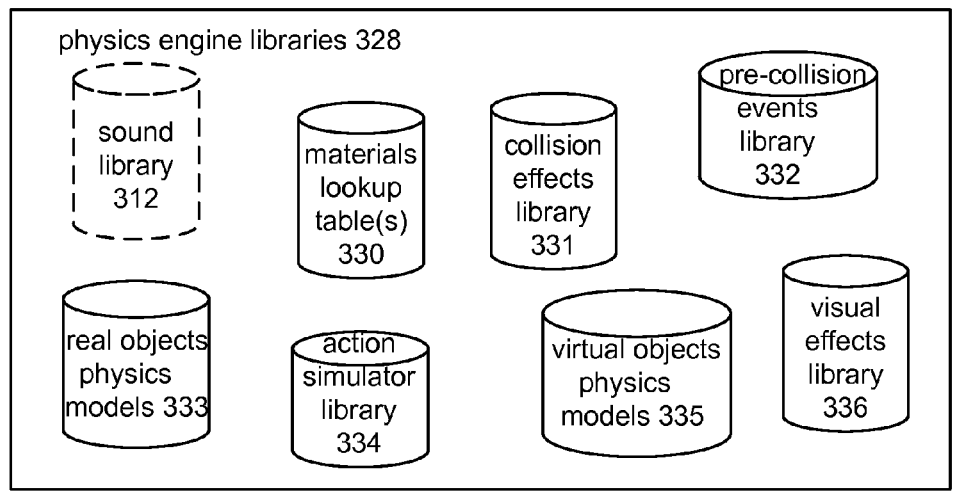
FIG. 4D illustrates some examples of physics engine libraries for use in updating physics models and simulating actions and effects.
Figure 4E:
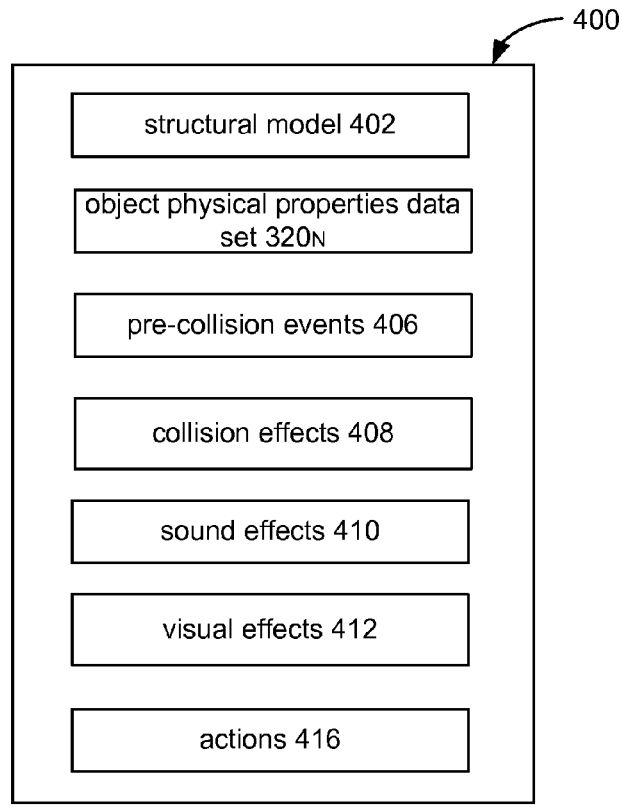
FIG. 4E illustrates an example of a physics model.

In many embodiments, a physics model is used to model and track an object. FIG. 4E illustrates an example of a physics model 400 and FIG. 4D illustrates some examples of physics engine libraries 328 for use in updating physics models and simulating actions and effects like collision effects, sound effects and visual effects. The illustrated examples of libraries 328 include one or more materials lookup tables 330 for identifying physics parameters like tensile strength and coefficients of friction for different types of materials. A pre-collision events library 332 includes data for representing events or actions, for example a gesture, which signal or trigger a collision. For example, an object landing on a certain area in an environment may be a trigger for an explosion. An action simulator library 334 includes software instructions for simulating movement of at least a part of an object based on input parameters of one or more physical properties. A collision effects library 331 comprises software routines for simulating a change in at least one physical property of an object during or resulting from a collision based on different input parameters. For example, a collision effect may be a change in surface shape of an object to the collision. Other examples are different crack patterns or different breaking patterns for different materials or the same material in different orientations. The sound library 312, besides being a resource for command and object recognition based on sound, may also store audio data for sound effects to be played by the 3D audio engine 304 and which may be linked with different simulated actions 334, pre-collision events 332 and collision effects 331. Similarly, the visual effects library 336 may store routines for animations, highlighting, and other types of visual enhancements which may also be associated with particular actions, pre-collision events and collision effects. The libraries 328 also store previously generated or stored virtual objects physics models 335 and real objects physics models 333. Persistent object identifiers may be associated with the physics models so once a real object is recognized as a previously recognized object, the physics model can be retrieved from storage rather than regenerated to save time. Similarly, virtual objects previously registered can be retrieved from the library 335 as well.

For virtual objects, the physics engine 308 has a software interface through which an application like the basketball application 166 mentioned in FIGS. 3A and 3B registers, for example stores in a library 334 or 335 or provides a link to a storage location, a physics model for each virtual object like the backboard 34, the net or hoop 38 and the basketball 30. For real objects, a physics model is generated for an object and may be reused. An example of a process for generating a physics model for a real object is illustrated below in FIG. 6C.

A physics model 400 includes a structural model 402 of the object. Some physics engines use larger rigid parts to model objects for a full rigid body type of system. Other physics engine use particles which can move individually to represent the structure of an object. One example of a particle system are a mass aggregate physics engine such as that described in Millington, pp. 145-148 in which particles can make up larger sections which are connected by rods, cables and springs. Another example of a particle based physics engine is a particle proxy approach. For example, see paragraph [0027] of U.S. Published Patent Application No. 2011/0261083 to Wilson entitled "Grasp Simulation of a Virtual Object," which application is hereby incorporated by reference in its entirety. The particle proxy approach employs representations of many small rigid bodies as proxies for a larger object. The rigid bodies are termed "proxies" because they are positioned to closely approximate the shape of the larger object. The effect of all of the particle proxies taken together is representative of a simulated collision between the larger object and another object because the particle proxies are moved to match the local motion of the larger object. The movement of particle proxies is achieved by applying a force of magnitude and direction to effect the movement of each particle proxy. Because each particle proxy is modeled as a rigid body in the physics simulation, it participates in collision and friction calculations like any other rigid body which allows rigid body physics laws to be implemented. Each particle is persistent in that its position changes are tracked over time as well as changes in its speed and direction which are changes in its velocity.

As an illustrative example, Joe's grasp on the basketball 30 in FIG. 3A is modeled as a simulation of frictional forces on the virtual basketball 30. The frictional forces applied to the virtual basketball 30 are modeled as persistent particle proxies. Each of the persistent particle proxies represents the impact of a single small force normal to the side of the virtual basketball object. Each of Joe's fingers meeting with the ball may be considered a simulated contact. A persistent particle proxy models a particular finger and represents the force of that finger. The proxy is used to model a change in the shape of the basketball due to the pressure from the finger, for example, an indentation. Due to the stiffness of basketballs at proper inflation as represented by the tensile strength of the surface material, any indentations may be negligible to the human eye. If Joe were holding a water balloon instead, the persistent particle proxies would represent Joe's finger forces as indentations on the balloon's surface as they would be clearly visible to a human eye due to the balloon surface material and inner material type of water. The shape of the water balloon would also change due to the softness of its materials.

A real object physics model is based on its object physical properties 320N determined from captured image data and physics parameter data 396N retrieved from object reference data sources. For a type of object 381, a base structural model may be selected like car, chair, ball, table, human, etc. as a starting point. Particles are then added to the base structural model to fit the 3D shape 384 of the specific real object and form the structural model 402 for the specific real object. The 3D shape 384 of the real object can be determined based on the object boundary data 400, like edges or a polygon mesh, determined for the object and 3D structure data determined to fit the object. In other examples, a base structural model is not used, and particles are fitted within the 3D shape 384.

Each particle may be assigned one or more physics parameter based on the physics parameters data set 396N determined for the real object. For example, the total mass assigned to the object may be subdivided among the particles. The subdivision of mass need not be evenly distributed if physical properties for different parts of an object are known. In the case of the glass table 32, the particles modeling the glass may have a smaller or larger mass than the wood sides depending on the thickness and type of glass determined. Similarly, the particles in the wood supports have a material type of wood associated with them and a tensile strength associated with wood assigned to them while the particles for the glass table have a material type and tensile strength for glass.

For virtual objects, an application can assign the types of actions 416 performed by each object. Some examples of actions are shoot a bullet, fly, be thrown, roll, bounce, slide, shatter, fold, crack, break, etc. For real objects, the physics engine may associate by default actions from an action simulator library 334 based on the type of object 381. For display of an action, the object physical properties 320N of the object are submitted as input parameters so the action is performed more realistically. Like with actions, the application can assign pre-collision events 406 for virtual objects either from the pre-collision events library 332 or create the events and store them in the library 332. Similarly, collision effects 408 can be assigned by the application for a virtual object. The physics engine may select by default pre-collision events 406, collision effects 408, and sound effects 410 for real objects based on the type of object 381. An application may also track one or more real objects in an environment and assign actions, pre-collision events, collision effects, sound effects and visual effects to the real objects or events, actions or collisions relating to them as well. User input may cause the application to do so in some instances.

Sound effects 410 and visual effects 412 may also be updated based directly or indirectly on user input. For example, a user may have selected a stadium mode for the basketball application such that a collision of a basket scored is accompanied by a swoosh sound and crowd noise and a highlighting effect on the ball as it passes through the net of basket hoop 38.

The simulation of action or effects or both determined by the physics engine 308 for either a real or virtual object in three dimensions is then transformed into display data usable by the virtual data engine 195 to represent the simulation on the display. The display data may be implemented in a markup language. For example, Extensible Markup Language (XML) may be used. In another example, a markup language like Virtual Reality Modeling Language (VRML) may be used as an interface format with the virtual data engine 195.

Virtual data engine 195 processes virtual objects and registers the 3D position and orientation of virtual objects or imagery in relation to one or more coordinate systems, for example in display field of view coordinates or in the view independent 3D map coordinates. The virtual data engine 195 determines the position of image data of a virtual object or imagery in display coordinates for each display optical system 14. Additionally, the virtual data engine 195 performs translation, rotation, and scaling operations for display of the virtual data at the correct size and perspective. A virtual data position may be dependent upon, a position of a corresponding object, real or virtual, to which it is registered. The virtual data engine 195 can update the scene mapping engine about the positions of the virtual objects processed.

Device data 198 may include a unique identifier for the computer system 8, a network address, e.g. an IP address, model number, configuration parameters such as devices installed, identification of the operating system, and what applications are available in the display device system 8 and are executing in the display system 8 etc. Particularly for the see-through, augmented reality display device system 8, the device data may also include data from sensors or determined from the sensors like the orientation sensors 132, the temperature sensor 138, the microphone 110, and the one or more location and proximity transceivers 144.

For illustrative purposes, the method embodiments below are described in the context of the system embodiments described above. However, the method embodiments are not limited to operating in the system embodiments described above and may be implemented in other system embodiments. Furthermore, the method embodiments are continuously performed, and there may be multiple collisions between objects being processed for a current display field of view and the field of view changes as the user moves her head and real and virtual objects move as well. A display typically has a display or frame rate which updates faster than the human eye can perceive, for example 30 frames a second.

Figure 5A:
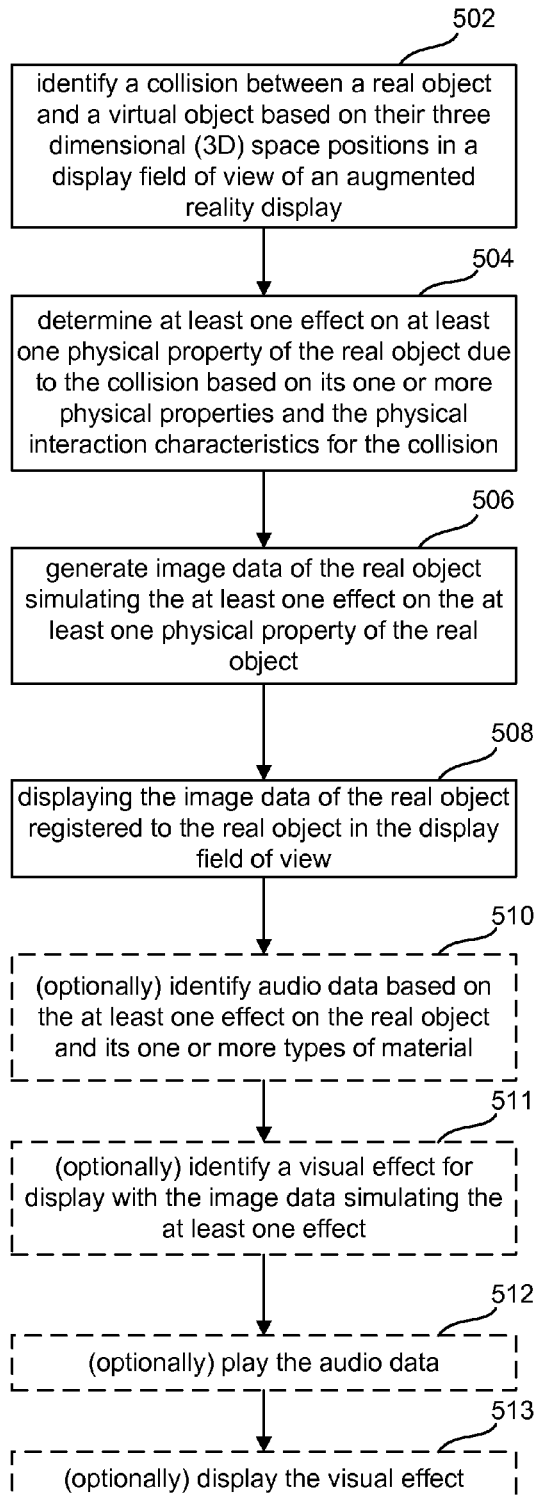
FIG. 5A is a flowchart of an embodiment of a method for displaying a collision between a real object and a virtual object by an augmented reality display device system.

FIG. 5A is a flowchart of an embodiment of a method for displaying a collision between a real object and a virtual object by an augmented reality display device system. Using the software system embodiment of FIG. 4A as an example context for illustration, the scene mapping engine 306 or the physics engine 308 or an application 166 based on object position data supplied by the scene mapping engine 306 may identify a collision between a real object and a virtual object in step 502 based on their three dimensional (3D) space positions in a display field of view of a see-through, augmented reality display. A 3D space is a volume of space occupied by the object. Depending on the precision desired, the 3D space can match the 3D shape of the object or be a less precise volume like a bounding shape like a bounding box or bounding ellipse around an object. A 3D space position represents position coordinates for the perimeter of the volume or 3D space. In other words the 3D space position identifies how much space an object occupies and where in the display field of view that occupied space is.

In one example, based on the parts of the objects meeting for the collision, for example hand and ball, the physics engine 308 may identify one or more types of collisions which an application 166 has registered with it. For example, a dribble may be identified based on identification through motion data determined from image data of a human palm facing downward and pushing a virtual basketball based on tracking of the ball's position. (The basketball application may have also registered the dribble action as a gesture, so when the gesture recognition engine 193 notifies the basketball application of the gesture, the basketball application can notify the physics engine 308 of the gesture as a type of collision.)

In step 504, the physics engine 308 determines at least one effect on at least one physical property of the real object due to the collision based on its one or more physical properties and the physical interaction characteristics for the collision. The physics engine 308 simulates realistic behavior of objects based on forces being applied to objects. Physical interaction characteristics describe parameters inputs for a force equation and the resultant one or more forces which are changeable for each collision. An example of such a force equation is Newton's Second Law which is force (F) equals mass (m) times acceleration (a) or F=ma, which is also written as $F=\frac{1}{2}mv^2$ where v is velocity. An example of a physical interaction characteristic is a speed at which each object is traveling when they meet. So is each object's velocity which is a vector quantity indicating direction of the object and its speed in that direction. For an object like a human being, there may be different velocities for different parts of the body which may make up a composite velocity for a part making the contact in the collision. Another physical interaction characteristic is the composite mass for object or object part involved in the collision. A basketball thrown by a stationary human receives less force than a basketball thrown by a human riding a bicycle. There may be ambient factors like wind or rain which effect velocity as well.

Force vectors are determined by the physics engine 308 on each of the objects based on their physical properties like mass and tensile strength and physical interaction characteristics like velocity and environmental forces like gravity. A frictional force may be determined based on a coefficient of friction for a surface type of material. A spring force may be determined if a modulus of elasticity of an object satisfies criteria to be significant. A resting force may be determined based on the types of materials making up an object. The physics engine 308 simulates the force vectors action on each structural model of the respective real and virtual objects.

Besides determining resultant actions, a collision effect on each object is determined. At least one physical property of an object is effected by a collision, but not all effects are visible to the human eye. In some embodiments, criteria is stored for each collision effect for determining whether the effect should be displayed. Some examples of criteria factors are a force strength, a force direction and a force density. What kind of effect is suitable is based on the forces involved but are also particular to the physical properties of a specific object like mass, structure as may be represented by size and shape, surface material and inner materials of an object.

An example of an effect was illustrated in FIG. 3B in the simulated collision between the virtual basketball $30_3$ and the glass table top 38. For the real object a cracked glass collision effect represented by cracks $35_N$ was displayed along with image data of broken glass pieces $37_N$. For the virtual basketball $30_3$, the effect was the bottom part of the ball appearing flattened 39 as it contacted the glass table top. Due to the strength of the reactive force directed from the table and the downward force applied by the ball and the force of gravity due to its direction and speed, a contact area with the glass table is determined for the basketball. In this example, the contact area is the spherical bottom of the ball which is modeled as deforming inward so the shape, a physical property of the basketball, was altered. From Joe's perspective, the bottom of the ball flattens 39. As glass has poor tensile strength, the cracked pattern effect, has criteria such as a minimum strength of force being exerted over a maximum surface area and within an angular range of the surface glass top 32.

Based on the changes to the structural model determined by the physics engine 308, in step 506 the virtual data engine 195 generates image data of the real object simulating the at least one effect on the at least one physical property of the real object like the change in the surface of the glass table, and in step 508 displays the image data of the real object registered to the real object in the display field of view. As in the embodiment of FIG. 4A, there may be audio data 312 and visual effects 336 linked to the cracked pattern collision effect 331 by an application, via user input directly to the physics engine or as part of the standard libraries of the physics engine 308.

Optionally, in step 510, the physics engine 308 identifies audio data based on the at least one effect on the real object and its one or more types of material. For example, the sound library 312 or the materials lookup table 330 may include parameter values for affecting pitch, tone and volume of audio data based on a type of material. Similarly, in optional step 511, a visual effect, e.g. starbursts or fireworks, for display with the image data simulating the at least one effect may be identified. Some examples of bases of identification may be the type of collision, a force strength associated with the collision, or a linking between the visual effect and the collision effect made by an application or in response to user input. In step 512, the 3D audio engine 304 plays the audio data and the virtual data engine 195, in step 513, displays the visual effect.

Figure 5B:
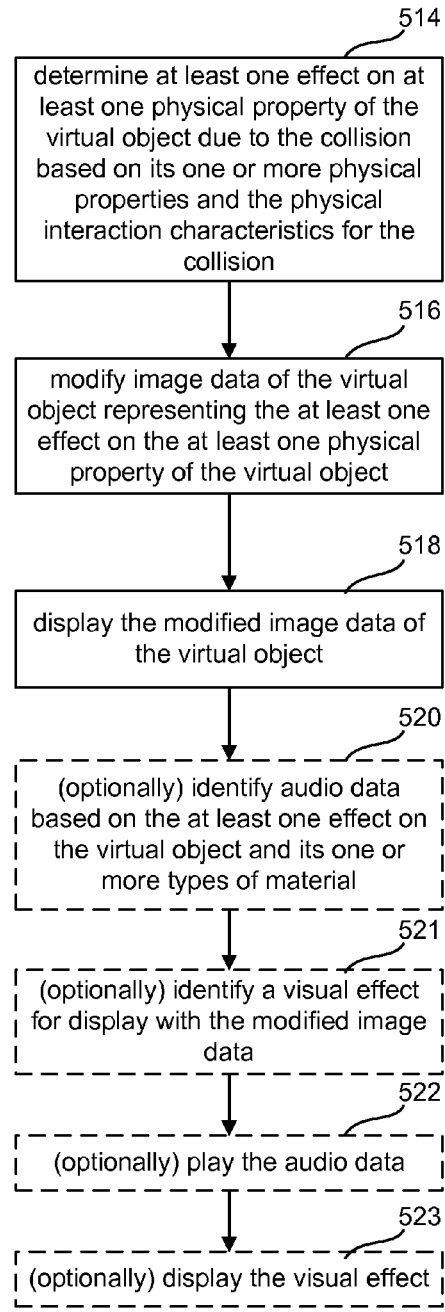
FIG. 5B is a flowchart of a process for displaying at least one effect on a virtual object for use in a method for displaying a collision between a real object and a virtual object by an augmented reality display device system.

FIG. 5B is a flowchart of a process for displaying at least one effect on a virtual object for use in a method for displaying a collision between a real object and a virtual object by an augmented reality display device system. Like for the real object, in step 514, the physics engine 308 determines at least one effect on at least one physical property of the virtual object due to the collision based on its one or more physical properties and the physical interaction characteristics for the collision, and the virtual data engine 195, in step 516, modifies the image data of the virtual object representing the at least one effect on the at least one physical property of the virtual object and, in step 518, displays the modified image data of the virtual object. The physics engine 308 may also optionally, in step 520, identify audio data based on the at least one effect on the virtual object and its assigned one or more types of material, and may also, optionally in step 521, identify a visual effect for display with the modified image data. The identification may be based on links registered by an application between an audio effect and a collision effect and between a visual effect and a collision effect. The 3D audio engine plays the audio data in optional step 522, and the virtual data engine 195 displays the visual effect in optional step 523.

When a new user enters an environment like the living room in FIGS. 3A and 3B where a scene mapping engine 306 has been executing by a hub 12 like the gaming console 12 or in another user's display system 8 operating in a share mode, the new user's system can save computation time and access an existing 3D mapping of the user environment, e.g. the living room, in real time and access already generated or stored physics models.

FIG. 6A is a flowchart of an example of an implementation process for identifying a physics model for an object. In step 602, the scene mapping engine 306 receives a 3D mapping of a user environment including a 3D space position and an identifier for a real object and a 3D space position and an identifier for a virtual object. The physics engine 308 retrieves in step 604 a stored physics model for the real object based on the identifier for the real object, and in step 606 retrieves a stored physics model for the virtual object based on the identifier for the virtual object.

A 3D mapping identifying different objects and linking physics models to the objects may not always exist, or a physics model may not exist for an object. An example of such a situation is when a new object is in a previously mapped area, or a 3D mapping is being initially generated for an environment.

FIG. 6B is a flowchart of an example of an implementation process for determining when to automatically generate a physics model for a real object. In step 612, the object recognition engine 192 identifies a real object in a display field of view of a see-through, augmented reality display device based on image data of the display field of view and in step 614 determines one or more physical properties of the real object based on the image data of the display field of view. The physics engine 308 is notified of the identified objects and their physical properties, and in step 616 searches stored physics models for an existing model for representing the real object based on the one or more physical properties determined for the real object in order to determine as in step 618 whether there exists a physics model for the real object. For example, physics models uploaded by users over time to a physics data store maintained by a software platform which supports the physics engine may be searched. Additionally, publicly accessible and privately accessible physics engine models in a standardized format may be searched. Examples of privately accessible models are those linked to user profile data 322 which are accessible to a service, for example a gaming service, with which a user is registered and which service platform supports the physics engine 308.

Responsive to an existing physics model being found, the physics engine 308 in step 620 uses the existing physics model for representing the real object. For example, a basketball made by a certain manufacturer may have a physics engine already stored for it, and the real object is the same kind of basketball. Responsive to an existing physics model not being found, in step 622, the physics engine 308 automatically generates a physics model for the real object based on the one or more physical properties of the real object.

FIG. 6C is a flowchart of an example of an implementation process for automatically generating a physics model for the real object based on one or more properties of the real object. In step 632, the physics engine 308 generates and stores a structural model (e.g. 402) based on a 3D shape physical property of the real object in a physics model for the real object. For example, as discussed previously for a particle system physics engine, particles, which can be controlled individually, can be assigned to each structure in 3D structure data for an object to fill out the 3D shape of the object. For example, particles can be associated with an arm or a leg of a human skeletal as a structure, and the particles fill in the region between the representation of a bone and object boundary data 400 like a polygon mesh region representing the outer surface the of the arm.

In step 634, the physics engine 308 associates one or more collision effects with the real object in the physics model based on the type of object and one or more types of material of the real object, and in step 636, the physics engine 308 associates one or more actions for the real object with the physics model based on a type of object for the real object. In step 638, the physics engine 308 may optionally automatically store the physics model in a network accessible data store for physics models as permitted by user share permissions.

Besides designating share permissions and such, user input may also indicate a change in a physical property associated with a real object. For example, the basketball application may allow a user to select a cartoon mode or a rubber mode in which objects react unrealistically with respect to their actual physical natures. A user can also pull up a virtual menu provided by the physics engine or an application, gaze at an object, and select by gesture or voice a physical property change which is then applied to the object, be it virtual or real.

Figure 7A:
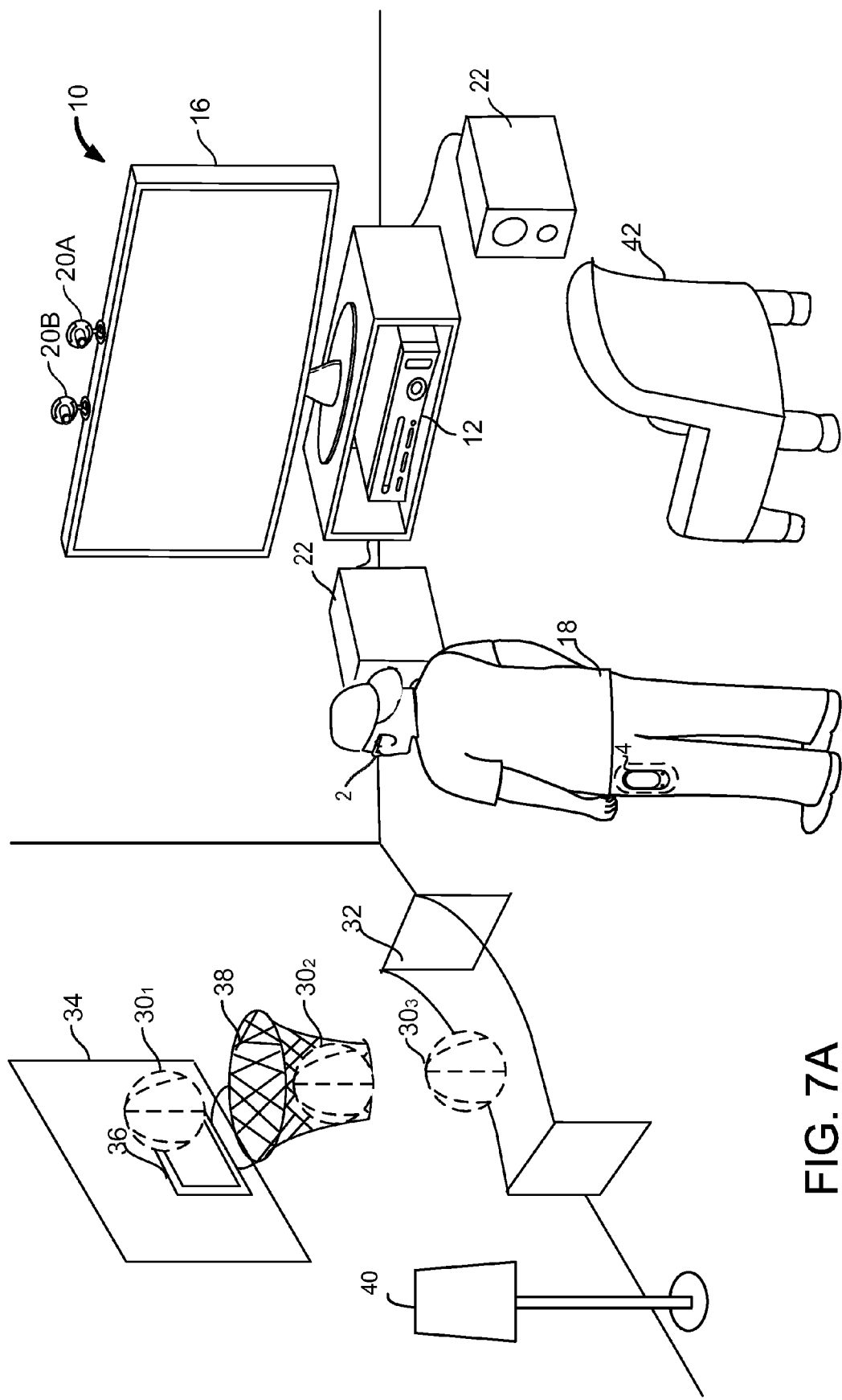
FIGS. 7A and 7B illustrates an example of a simulated effect on a physical state of a real object due to a physical property of the real object being changed in data for the real object as well as a simulated effect on a physical state of another real object for which physical properties have not been changed.
Figure 7B:
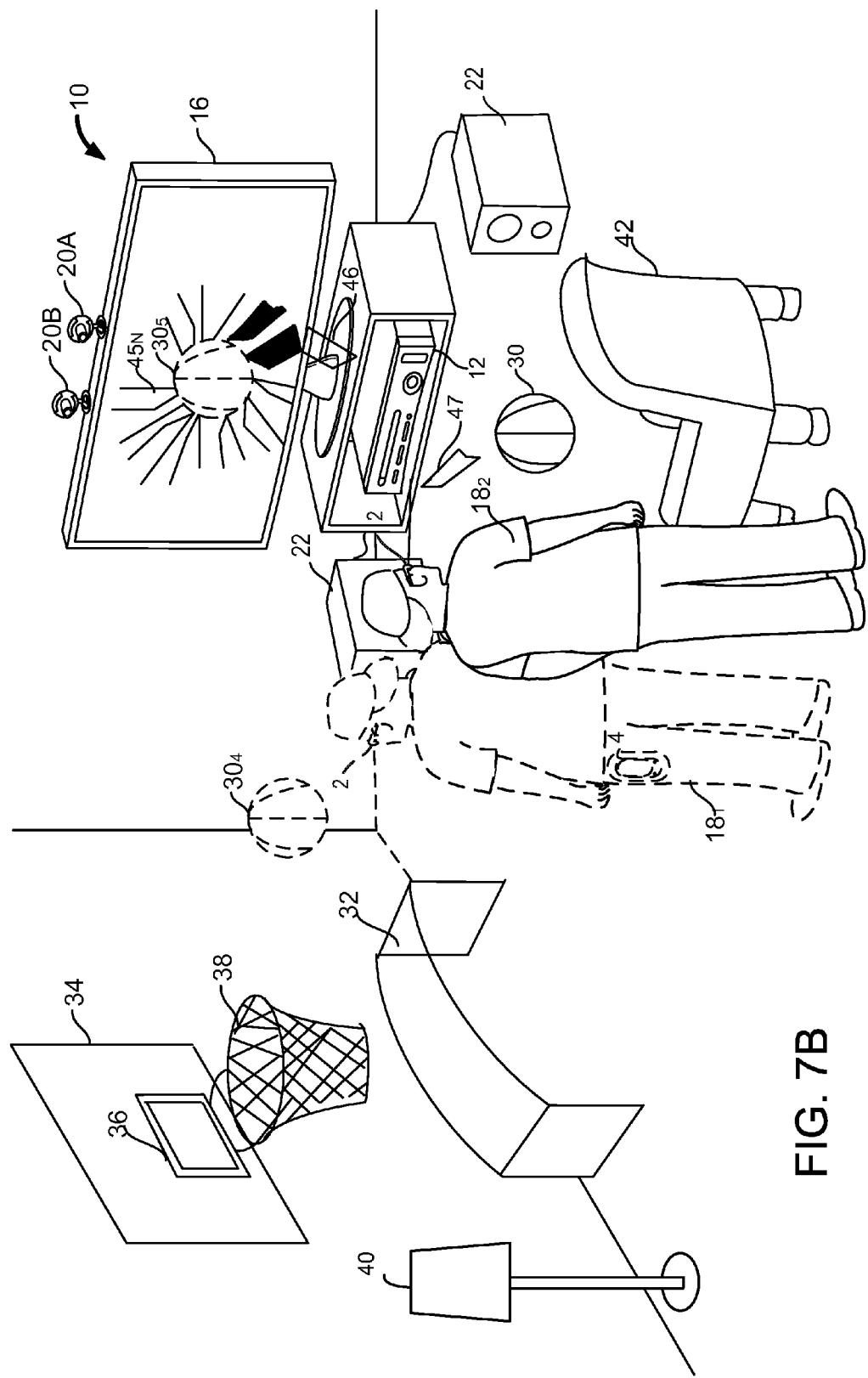

FIGS. 7A and 7B illustrates an example of a simulated effect on a physical state of a real object due to a physical property of the real object being changed as well as a simulated effect on a physical property of another real object for which physical properties have not been changed. In the example of FIG. 7A, the user has selected a menu selection of "make bouncy" for the glass table top 32. The result is that the physics engine 308 generates a version of the physics model of the glass table in which a material type of rubber with a very high modulus of elasticity is substituted for the glass. This "bouncy" version of the glass table top 32 is then used to simulate subsequent collisions. In FIG. 7A, the effect on table top 32 now modeled as a type of rubber is a bending like rubber. The bottom of virtual object $30_3$ is more rounded or less flat as the rubbery table top bends around the basketball unlike the absorption of energy by glass table top in FIG. 3B resulting in cracked and broken glass.

FIG. 7B illustrates the unrealistic bounce back effect of the now rubbery table top 32 which releases the absorbed energy by bending back upwards which gives the basketball $30_4$ energy for a high bounce rather than the short bounce or roll to the floor as in FIG. 3B. Joe moves from position $18_1$ to position $18_2$ to view the path of the basketball from the table 32, across the room, to colliding with such force as shown by position $30_5$ with the television 16 that the TV display not only cracks, as illustrated by cracks like representative crack 45N, but breaks resulting in glass pieces 46 and 47 separating from the display and falling to the ground, with the assistance of a gravity force component, from the vertical surface of television display 16. The cracking and breaking of the display is based on its physics model which is based on realistic physical properties of the TV display 16.

Figure 8:
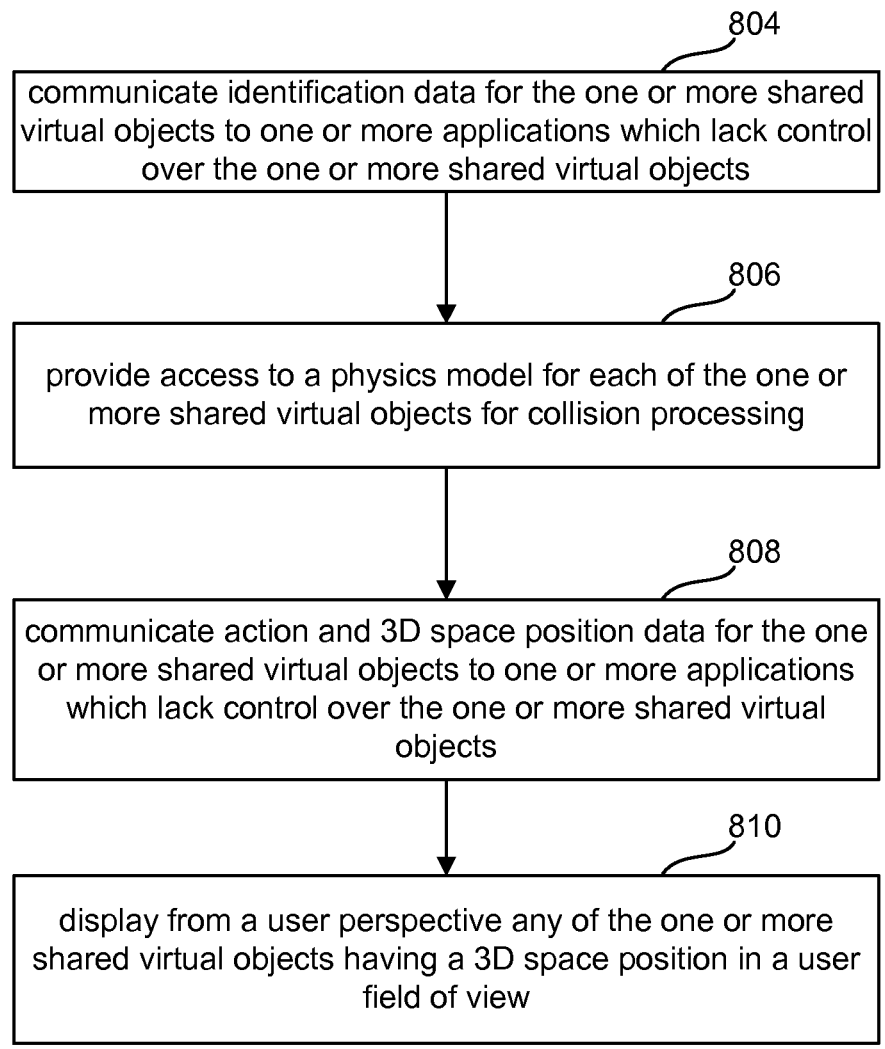
FIG. 8 is a flowchart of an embodiment of a method for managing interactions between shared virtual objects under control of different applications executing in one or more processors of an augmented reality display device system.

FIG. 8 is a flowchart of an embodiment of a method for displaying collisions between shared virtual objects under control of different applications executing in one or more processors of a see-through, augmented reality display device system. The applications may be executing on the same display device system 8 or on different display device systems 8 as in the example of FIGS. 9A and 9B below. Using the system embodiment of FIG. 4A as an illustrative context, the operating system 190 receives notification of activation of sharing of one or more virtual objects between applications. For example, user input may have selected a share mode for a display device system 8 in which virtual data generated by the device system 8 can be shared with other systems 8. In step 804, identification data is communicated for the one or more shared virtual objects to one or more applications which lack control over the one or more shared virtual objects. The operating system 190 may indicate to the applications that they were designated for share mode and set up an interprocess communication between the applications. In step 808, each application sharing one or more virtual objects, which it generates and controls, provides access to a physics model for each of the one or more shared virtual objects for collision processing. For example, the physics models for the virtual objects may be in the library 335, but the physics engine 308 is notified that the virtual objects are shared and can therefore make collisions.

In step 810, each application sharing one or more virtual objects which it controls communicates action and 3D space position data for the one or more shared virtual objects to one or more applications which lack control over the one or more shared virtual objects. The communication may be indirect, for example via the scene mapping engine 306 and the physics engine 308. The 3D scene mapping engine 306 may receive an update of applications to which to report 3D space position data of the shared virtual objects and updates a 3D mapping of a user environment to include space position data of the one or more shared virtual objects.

In step 812, the virtual data engine 195 displays any of the one or more shared virtual objects having a 3D space position in a current display field of view from the perspective indicated by the display field of view. The perspective indicated by the display field of view is also referred to as the user perspective.

Figure 9A:
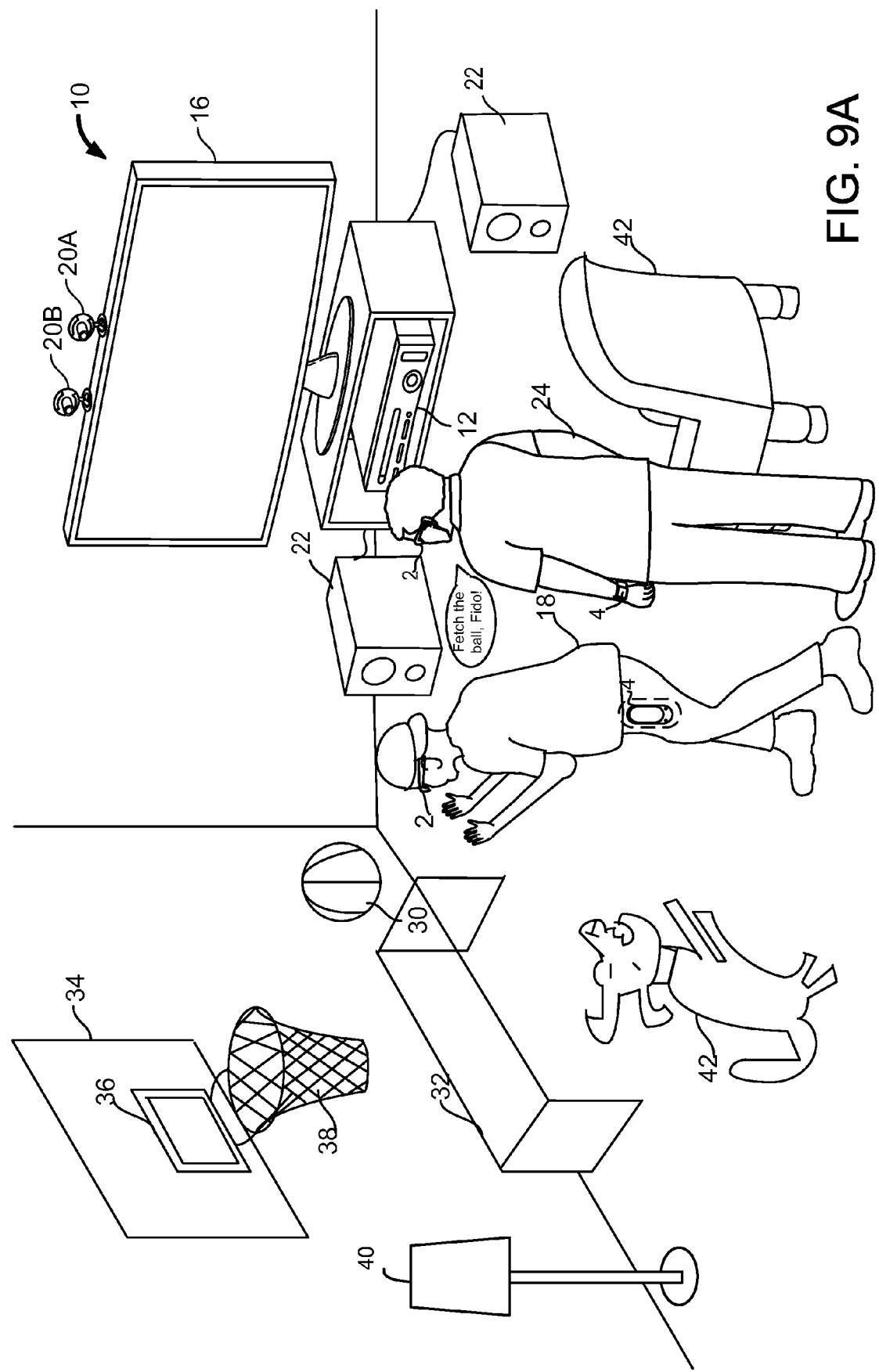
FIG. 9A illustrates an example of a user environment in which a user wearing an augmented reality device can see virtual objects from different applications.

FIG. 9A illustrates an example of a user environment in which a user wearing an augmented reality display device can see virtual objects from different applications. Bob 24 has entered the living room where Joe 18 has just thrown virtual basketball 30 towards the virtual basketball net 38. The display systems 8 (2 and 4) of Bob and Joe can communicate in a share mode in which a virtual object from an application executing on either device may be seen in the see-through, augmented reality display 2 of the other user as well. In one example, software executing on the hub computer 12 identifies Joe and Bob are present in the same user environment based on device data like a location sensor 144 or based on their both establishing a communication session with the hub system 12 and sharing their field of view data or location data or both. In another example, Joe and Bob are friends identified in user profile data 322, and software executing on the hub 12 can indicate to each that the other is present in the same location based on location data or uploaded image data. In another example, the display systems 8 themselves may be in a peer-to-peer share mode. Each user may grant permission to share their displayed data at one or more levels, e.g. a per user basis, or a user group basis including an all group. Identification data may be transferred directly via IR transceivers 144 or over a network, e.g. a WiFi or cell network.

The other application still controls the behavior and appearance of the virtual object, so in some instances, the application which lacks control over the virtual object may categorize the virtual object as a real object for purposes of control or interaction. For example, the basketball application may identify the pet dog 42 as a real object, and the pet dog application 42 may identify the basketball 30 as a real object. Some other category or designation indicating lack of control may be applied in other examples as well. The physics engine simulates a collision between the dog 42 and the basketball 30 based on their physics models 400 defined by their respective applications.

In the example of FIG. 9A, with his display device 2 in share mode, Bob's 24 display system (2 and 4) is currently executing a pet dog application in which a virtual dog performs actions like fetch, catch, sit etc. associated with dogs generally. Bob 24 can see Joe's virtual basketball 30, and speaks a command "Fetch the ball, Fido!" which his pet dog application will recognize in data from his microphone 110. The pet dog application checks the 3D mapping for a ball and identifies the virtual basketball 30 moving through the air.

Figure 9B:
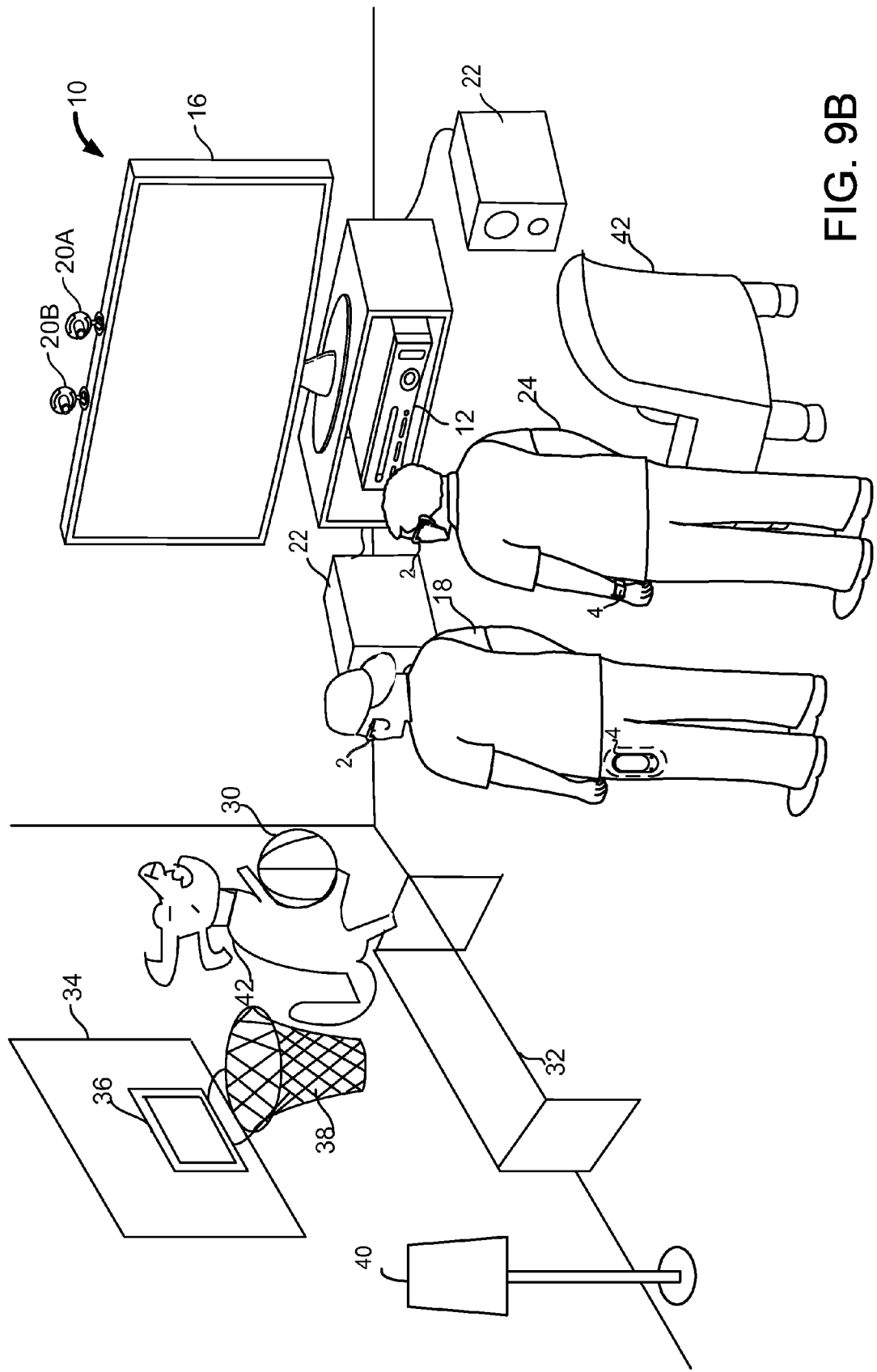
FIG. 9B illustrates an example of a collision between two of the virtual objects, each being controlled by a separately executing application.

FIG. 9B illustrates an example of a collision between two virtual objects, each being controlled by a separately executing application. In this view of the example, both Bob and Jim are looking at the virtual basketball 30 through their see-through augmented reality display devices 2, and both see from his respective perspective Fido 42 air catch the ball in order to fetch it for Bob 24. The pet dog application treats the virtual basketball 30 as any other ball, and determines the ball is in the air based on the 3D mapping and selects an air catch action which it has registered in the action simulator library 334 and which the pet dog application has associated with the physics model for Fido. The physics engine 308 simulates the air catch action and contours Fido's body around the basketball 30 based on the type of action, air catch, and the physics models for Fido and the basketball 30. Fido's action is reported to the basketball application which processes the action with respect to the basketball according to its own logic. For example, the basketball application may categorize Fido's catch as a steal of the ball in Joe's profile and statistics for his session according to its rules.

The following discussion describes some example processing for updating a display to position virtual objects so that they appear realistically at 3D locations in the display determined for them by the physics engine or an application. In one example implementation of updating the 3D display, the virtual data engine 195 renders the previously created three dimensional model of the display field of view including depth data for both virtual and real objects in a Z-buffer. The real object boundaries in the Z-buffer act as references for where the virtual objects are to be three dimensionally positioned in the display as the image generation unit 120 only displays the virtual objects as the display device is a see-through display device. For a virtual object, the virtual data engine 195 has a target space position of where to insert the virtual object. In some examples, the virtual object target position is registered to a position of a real world object, and in other examples, the virtual object is independent of a particular real object.

A depth value is stored for each display element or a subset of display elements, for example for each pixel (or for a subset of pixels). Virtual images corresponding to virtual objects are rendered into the same z-buffer and the color information for the virtual images is written into a corresponding color buffer. The virtual images include any modifications to virtual image data based on collision processing. In this embodiment, the composite image based on the z-buffer and color buffer is sent to image generation unit 120 to be displayed at the appropriate pixels. The display update process can be performed many times per second (e.g., the refresh rate).

As with different aspects of the methods discussed above, the different steps for updating the display may be performed solely by the see-through, augmented reality display device system 8 or collaboratively with one or more other computer systems like the hub computing systems 12 or other display device systems 8.

FIG. 10 is a block diagram of one embodiment of a computing system that can be used to implement one or more network accessible computing systems 12 or a processing unit 4 which may host at least some of the software components of computing environment 54 or other elements depicted in FIG. 4A. With reference to FIG. 10, an exemplary system includes a computing device, such as computing device 900. In its most basic configuration, computing device 900 typically includes one or more processing units 902 including one or more central processing units (CPU) and one or more graphics processing units (GPU). Computing device 900 also includes memory 904. Depending on the exact configuration and type of computing device, memory 904 may include volatile memory 905 (such as RAM), non-volatile memory 907 (such as ROM, flash memory, etc.) or some combination of the two. This most basic configuration is illustrated in FIG. 9 by dashed line 906. Additionally, device 900 may also have additional features/functionality. For example, device 900 may also include additional storage (removable and/or non-removable) including, but not limited to, magnetic or optical disks or tape. Such additional storage is illustrated in FIG. 9 by removable storage 908 and non-removable storage 910.

Device 900 may also contain communications connection(s) 912 such as one or more network interfaces and transceivers that allow the device to communicate with other devices. Device 900 may also have input device(s) 914 such as keyboard, mouse, pen, voice input device, touch input device, etc. Output device(s) 916 such as a display, speakers, printer, etc. may also be included. All these devices are well known in the art and need not be discussed at length here.

The example computer systems illustrated in the figures include examples of computer readable storage devices. A computer readable storage device is also a processor readable storage device. Such devices may include volatile and non-volatile, removable and non-removable memory devices implemented in any method or technology for storage of information such as computer readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the desired information and which can be accessed by a computer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for displaying a simulated collision between a real object and a virtual object using a see-through augmented reality display device comprising:

for real and virtual objects present in a displayed field of view of the see-through augmented reality display device, identifying at least one collision between a first real object having one or more parts that are viewable through a see-through portion of the see-through augmented reality display device and a first virtual object based on respective three dimensional (3D) augmented reality space positions associated with the first real and virtual objects;

determining at least one virtual-world deformative effect to be virtually imparted to a part of the first real object due to the virtual space collision based on one or more of determined pre-collision physical properties assigned to respective parts of the first real object and of determined physical interaction characteristics for the collision;

generating image data for the first real object simulating the at least one virtual-world deformative effect as having been virtually imparted to a collision affected part of the first real object, where the collision affected part of the first real object is not actually deformed by the collision with the first virtual object; and displaying the generated image data including the at least one deformative effect virtually imparted to the collision affected part of the first real object using the see-through augmented reality display device, where the generated and displayed image data of the collision affected part is registered to a location of the first real object as seen using the see-through augmented reality display device.

2. The method of claim 1, wherein the physical interaction characteristics for the collision include a velocity of at least one of the first real object and of the first virtual object in the display field of view.

3. The method of claim 1 wherein the see-through augmented reality display device is a three-dimensional scene displaying head mounted display device, the method further comprising:

determining at least one change to at least one physical property of the first virtual object due to the collision based on its pre-collision physical properties and the determined physical interaction characteristics for the collision;

modifying image data of the first virtual object for representing the at least one change to its at least one physical property; and displaying the modified image data of the virtual object in addition to said displaying of the generated image data including the at least one deformative effect virtually imparted to the first real object.

4. The method of claim 1 wherein the step of determining the at least one virtual-world deformative effect on the simulated version of the first real object due to the collision further comprises:

simulating the collision by use of a physics engine and based on a pre-collision physics model for the first real object, a pre-collision physics model for the first virtual object, on the determined physical interaction characteristics for the collision and on determined physics rules for a current physical environment of the first real and virtual objects.

5. The method of claim 1 further comprising:

receiving a 3D mapping of a user environment including a 3D space position and an identifier for the first real object and a 3D space position and an identifier for the first virtual object;

retrieving a stored, current physics model for the first real object based on the identifier for the first real object; and retrieving a stored, current physics model for the first virtual object based on the identifier for the first virtual object.

6. The method of claim 1 further comprising:

identifying the first real object in image data of the display field of view;

determining one or more current physical properties of the first real object based on the image data and object reference data sources; and responsive to not finding an existing physics model for the first real object, automatically generating a physics model for the first real object based on the one or more physical properties.

7. The method of claim 6 wherein automatically generating a physics model for the real object based on the one or more physical properties further comprises:

generating and storing a structural model based on a 3D shape physical property of the first real object;

associating one or more collision effects with the collision affected part of the first real object in the physics model based on the type of object and one or more types of material assigned to the collision affected part of the first real object;

associating one or more actions with the collision affected part of the first real object in the physics model based on a type of object for the first real object; and automatically storing the physics model in a network accessible data store for physics models.

8. The method of claim 6 further comprising:

responsive to user input indicating a change in the one or more physical properties of the first real object, generating a version of the physics model of the first real object with the change in the one or more physical properties of the first real object; and the physics engine using the version of the physics model for simulating a subsequent collision and a corresponding deformative effect virtually being imparted to the first real object.

9. The method of claim 1 wherein the at least one deformative effect virtually imparted to the first real object depicts the first real object as having been cracked.

10. The method of claim 1 wherein the at least one deformative effect virtually imparted to the first real object depicts the first real object as having been broken.

11. The method of claim 1 wherein the at least one deformative effect virtually imparted to the first real object depicts the first real object as having been bent.

12. An augmented reality display device system for displaying a realistic collision between a virtual object and a real object comprising:

an augmented reality display device including a see-through augmented reality display having a display field of view in which one or more parts of the real object are viewable as light passing through a see-through portion of the see-through augmented reality display;

one or more processors communicatively coupled to the augmented reality display for controlling the display;

the one or more processors being communicatively coupled to at least one camera for receiving image and depth data including the display field of view captured by the at least one camera;

the one or more processors being configured to identify a collision between a virtual object and the real object in the field of view based on the received image and depth data and a three dimensional space position of the virtual object in the display field of view;

the one or more processors being configured to implement a physics engine that simulates a virtualized collision in a virtual space based on a physics model representing one or more physical properties of a collision affected part of the real object, a physics model representing one or more physical properties of the virtual object and physical interaction characteristics of the collision;

the one or more processors being configured to generate image data simulating the collision including at least one virtual-world deformative effect imparted onto the collision affected part of the real object as a result of the virtualized collision; and the augmented reality display being configured to display the generated image data for the affected part of the real object as being registered to a corresponding portion of the real object.

13. The augmented reality display device system of claim 12 further comprising:
the one or more processors being configured for modifying image data of the virtual object for representing at least one effect imparted on at least one physical property of the virtual object due to the virtualized collision with the real object.

14. The augmented reality display device system of claim 12 wherein the at least one virtual-world deformative effect imparted onto the registered image of the real object is selected from the group consisting of a cracking of the image-represented real object, a bending of the image-represented real object and a breaking apart of the image-represented real object.

15. The augmented reality display device system of claim 12 further comprising:
the one or more processors configured for implementing an object recognition engine for identifying one or more physical properties for the real object based on captured image data of the real object and object reference data storing one or more properties of real objects; and
the one or more processors having access to one or more network accessible data stores storing the object reference data.

16. The augmented reality display device system of claim 12 wherein the physics model for the real object and the physics model for the virtual object respectively comprise a structural model of the object, object physical properties data, one or more actions associated with the respective object, and one or more collision effects associated with the respective object.

17. One or more processor readable storage devices comprising
instructions which cause one or more processors to execute a method for displaying a collision between a real object and a virtual object by an augmented reality display device system, the augmented reality display device system including a see-through augmented reality display having a display field of view in which one or more parts of the real object are viewable as light passing through a see-through portion of the see-through augmented reality display, the method comprising:
communicating identification data for one or more shared virtual objects to one or more applications which lack control over the one or more shared virtual objects;
providing access to a physics model for each of the one or more shared virtual objects for collision processing;
communicating action and 3D space position data, including collision action data for collisions with the real object for the one or more shared virtual objects to the one or more applications which lack control over the one or more shared virtual objects; and
displaying from a user perspective and by way of the see-through augmented reality display, any of the one or more shared virtual objects having a 3D space position in a display field of view and as having collided with and imparted corresponding virtual-world deformative effects to a corresponding one or more of collision affected parts of the real object, where other parts of the real object which are not collision affected parts can be viewed with use of light passing through corresponding see-through portions of the see-through augmented reality display if not obstructed by virtual objects.

18. The one or more processor readable storage devices of claim 17 further comprising that one or more applications controlling the one or more shared virtual objects are executing on at least one other augmented reality display device system in the user environment.

19. The one or more processor readable storage devices of claim 18 further comprising the one or more applications which lack control over the one or more shared virtual objects designating the one or more shared virtual objects as real objects for control processing.

20. The one or more processor readable storage devices of claim 17 wherein communicating action and 3D space position data for the one or more shared virtual objects to the one or more applications which lack control over the one or more shared virtual objects further comprises:
updating a 3D mapping of a user environment to include space position data of the one or more shared virtual objects.

\* \* \* \* \*